United States Patent
Aepli et al.

(10) Patent No.: US 10,767,047 B2
(45) Date of Patent: *Sep. 8, 2020

(54) REINFORCED POLYAMIDE MOLDING COMPOUNDS HAVING LOW HAZE AND MOLDED BODIES THEREFROM

(71) Applicant: EMS-PATENT AG, Domat/Ems (CH)

(72) Inventors: Etienne Aepli, Domat/Ems (CH); Botho Hoffmann, Domat/Ems (CH); Heinz Hoff, Tamins (CH)

(73) Assignee: EMS-Patent AG, Domat/Ems (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/104,028

(22) Filed: Aug. 16, 2018

(65) Prior Publication Data

US 2019/0055404 A1 Feb. 21, 2019

(30) Foreign Application Priority Data

Aug. 18, 2017 (EP) .................................. 17186918

(51) Int. Cl.
| | | |
|---|---|---|
| *C08L 77/06* | (2006.01) | |
| *C08G 69/36* | (2006.01) | |
| *B32B 27/34* | (2006.01) | |
| *C08G 69/26* | (2006.01) | |

(52) U.S. Cl.
CPC .............. *C08L 77/06* (2013.01); *B32B 27/34* (2013.01); *C08G 69/265* (2013.01); *C08G 69/36* (2013.01); *C08L 2201/10* (2013.01)

(58) Field of Classification Search
USPC .................................................. 524/492, 538
See application file for complete search history.

(56) References Cited

U.S. PATENT DOCUMENTS

| | | |
|---|---|---|
| 6,482,889 B1 | 11/2002 | Kurz |
| 7,723,411 B2 | 5/2010 | Schneider |
| 7,973,191 B2 | 7/2011 | Döring et al. |
| 8,022,170 B2 | 9/2011 | Hoffman et al. |
| 8,268,956 B2 | 9/2012 | Bühler et al. |
| 8,383,244 B2 | 2/2013 | Bayer et al. |
| 8,404,323 B2 | 3/2013 | Pfleghar et al. |
| 8,586,662 B2 | 11/2013 | Harder et al. |
| 8,604,120 B2 | 12/2013 | Stoppelmann et al. |
| 8,993,662 B2 | 3/2015 | Harder |
| 9,109,115 B2 | 8/2015 | Bühler |
| 9,133,322 B2 | 9/2015 | Roth et al. |
| 9,359,532 B2 | 6/2016 | Kaplan |
| 9,453,106 B2 | 9/2016 | Bühler |
| 9,644,081 B2 | 5/2017 | Aepli et al. |
| 9,663,655 B2 | 5/2017 | Aepli et al. |
| 9,815,967 B2 | 11/2017 | Harder et al. |
| 9,963,547 B2 | 5/2018 | Hoppe et al. |
| 9,963,591 B2 | 5/2018 | Bayer et al. |
| 9,969,882 B2 | 5/2018 | Thomas et al. |
| 2006/0235190 A1 | 10/2006 | Hoffman et al. |
| 2008/0135720 A1 | 6/2008 | Bühler et al. |
| 2008/0300347 A1 | 12/2008 | Kurz et al. |
| 2010/0069657 A1 | 3/2010 | Döring et al. |
| 2010/0168423 A1 | 7/2010 | Döring et al. |
| 2010/0279111 A1 | 11/2010 | Harder et al. |
| 2011/0220667 A1 | 9/2011 | Pfleghar et al. |
| 2012/0029133 A1 | 2/2012 | Stöppelmann et al. |
| 2012/0115993 A1 | 5/2012 | Kaplan |
| 2012/0237708 A1 | 9/2012 | Caviezel et al. |
| 2012/0321829 A1 | 12/2012 | Bayer et al. |
| 2013/0317168 A1 | 11/2013 | Bühler |
| 2014/0094548 A1 | 4/2014 | Roth et al. |
| 2014/0135458 A1 | 5/2014 | Kaplan |
| 2014/0171573 A1 | 6/2014 | Bayer et al. |
| 2014/0272227 A1 | 9/2014 | Jeltsch et al. |
| 2014/0275392 A1 | 9/2014 | Buhler |
| 2015/0051343 A1 | 2/2015 | Kaplan |
| 2015/0104638 A1 | 4/2015 | Jeltsch et al. |
| 2015/0126635 A1 | 5/2015 | Liedloff et al. |
| 2015/0126701 A1 | 5/2015 | Liedloff et al. |
| 2015/0218374 A1 | 8/2015 | Thomas et al. |
| 2015/0284531 A1 | 10/2015 | Aepli et al. |
| 2015/0291795 A1 | 10/2015 | Aepli |
| 2015/0352765 A1 | 12/2015 | Hoffmann et al. |
| 2015/0368398 A1 | 12/2015 | Hoppe et al. |
| 2016/0130439 A1 | 5/2016 | Koch et al. |
| 2016/0264542 A1 | 9/2016 | Giles |
| 2016/0280914 A1 | 9/2016 | Thomas et al. |
| 2016/0297123 A1 | 10/2016 | Weis et al. |
| 2016/0369098 A1 | 12/2016 | Yasuda et al. |
| 2016/0376423 A1 | 12/2016 | Harder et al. |
| 2017/0058123 A1 | 3/2017 | Sütterlin et al. |
| 2017/0107326 A1 | 4/2017 | Bayer et al. |
| 2017/0137608 A1 | 5/2017 | Stöppelmann |

(Continued)

FOREIGN PATENT DOCUMENTS

| | | |
|---|---|---|
| EP | 2 169 008 A1 | 3/2010 |
| WO | WO 2015/132510 A1 | 9/2015 |

OTHER PUBLICATIONS

U.S. Appl. No. 10/536,494, filed May 24, 2005.

(Continued)

*Primary Examiner* — Fred M Teskin
(74) *Attorney, Agent, or Firm* — Leydig, Voit & Mayer, Ltd.

(57) ABSTRACT

The present invention relates to a polyamide molding compound comprising the following components or consisting of these components: (A) 50 to 95 wt % of a mixture comprising the specific polyamides (A1) and (A2); (B) 5 to 50 wt % of at least one glass filler having a refractive index in the range from 1.510 to 1.539; (C) 0 to 10 wt % of at least one additive; wherein the weight proportions of the components (A) to (C) add up to 100% by weight; wherein the content of (A1) in the mixture (A) is >50 wt %, if the ratio is $\Delta 2/\Delta 1 > 1$ and the content of (A2) in the mixture (A) is >50 wt %, if the ratio is $\Delta 2/\Delta 1 \leq 1$, where $\Delta 1 = n(A1) - n(B)$ applies and $\Delta 2 = n(B) - n(A2)$ applies; wherein the transparent polyamides (A1) and (A2) have a transparency of at least 90% and a haze of at most 3%; and wherein the mixture (A) has a transparency of at least 88% and a haze of at most 5%. The present invention furthermore relates to molded bodies composed of these polyamide molding compounds.

18 Claims, No Drawings

(56) References Cited

U.S. PATENT DOCUMENTS

| | | |
|---|---|---|
| 2017/0137609 A1 | 5/2017 | Stöppelmann |
| 2017/0183140 A1 | 6/2017 | Sütterlin et al. |
| 2017/0225414 A1 | 8/2017 | Cheung |
| 2018/0022900 A1 | 1/2018 | Nakano et al. |
| 2018/0100064 A1 | 4/2018 | Aepli et al. |
| 2018/0112059 A1 | 4/2018 | Fujii et al. |
| 2018/0155545 A1 | 6/2018 | Stöppelmann et al. |
| 2018/0171141 A1 | 6/2018 | Thomas et al. |
| 2018/0251599 A1 | 9/2018 | Hoffmann et al. |
| 2018/0251600 A1 | 9/2018 | Aepli et al. |

OTHER PUBLICATIONS

U.S. Appl. No. 10/553,259, filed Jul. 24, 2006.
U.S. Appl. No. 11/950,964, filed Dec. 5, 2007.
U.S. Appl. No. 12/743,097, filed Nov. 12, 2008.
U.S. Appl. No. 13/045,682, filed Mar. 11, 2011.
U.S. Appl. No. 13/186,785, filed Jul. 20, 2011.
U.S. Appl. No. 13/481,451, filed May 25, 2012.
U.S. Appl. No. 13/800,102, filed Mar. 13, 2013.
U.S. Appl. No. 13/898,099, filed May 20, 2013.
U.S. Appl. No. 13/971,376, filed Aug. 20, 2013.
U.S. Appl. No. 14/205,667, filed Mar. 12, 2014.
U.S. Appl. No. 14/607,676, filed Jan. 28, 2015.
U.S. Appl. No. 14/663,105, filed Mar. 19, 2015.
U.S. Appl. No. 14/681,669, filed Apr. 8, 2015.
U.S. Appl. No. 14/729,277, filed Jun. 3, 2015.
U.S. Appl. No. 14/740,736, filed Jun. 16, 2015.
U.S. Appl. No. 14/915,031, filed Feb. 26, 2016.
U.S. Appl. No. 14/935,642, filed Nov. 9, 2015.
U.S. Appl. No. 15/090,881, filed Apr. 5, 2016.
U.S. Appl. No. 15/105,011, filed Sep. 6, 2016.
U.S. Appl. No. 15/253,506, filed Aug. 31, 2016.
U.S. Appl. No. 15/285,947, filed Oct. 5, 2016.
U.S. Appl. No. 15/349,636, filed Nov. 11, 2016.
U.S. Appl. No. 15/349,729, filed Nov. 11, 2016.
U.S. Appl. No. 15/385,432, filed Dec. 20, 2016.
U.S. Appl. No. 15/385,519, filed Dec. 20, 2016.
U.S. Appl. No. 15/546,373, filed Jul. 26, 2017.
U.S. Appl. No. 15/729,321, filed Oct. 10, 2017.
U.S. Appl. No. 15/789,069, filed Oct. 20, 2017.
U.S. Appl. No. 15/826,177, filed Nov. 29, 2017.
U.S. Appl. No. 15/895,537, filed Feb. 13, 2018.
U.S. Appl. No. 15/910,877, filed Mar. 2, 2018.
U.S. Appl. No. 15/910,891, filed Mar. 2, 2018.
U.S. Appl. No. 15/955,737, filed Apr. 18, 2018.
U.S. Appl. No. 16/104,035, filed Aug. 16, 2018.
U.S. Appl. No. 16/104,043, filed Aug. 16, 2018.
U.S. Appl. No. 16/115,055, filed Aug. 28, 2018.
European Patent Office, Extended European Search Report in European Patent Application No. 17186918.3 (dated Feb. 21, 2018).

REINFORCED POLYAMIDE MOLDING COMPOUNDS HAVING LOW HAZE AND MOLDED BODIES THEREFROM

CROSS-REFERENCE TO A RELATED APPLICATION

This patent application claims the benefit of European Patent Application No. 17 186 918.3, filed on Aug. 18, 2017, the disclosure of which is incorporated herein by reference in its entirety for all purposes.

The present invention relates to polyamide molding compounds having low haze filled with glass, to molded bodies manufactured therefrom, and to use of same.

Due to their very good optical and mechanical characteristics, the use of amorphous or microcrystalline polyamide molding compounds is very widespread for applications in the fields of automotive parts, electronics, optical components, shields, housings, visible surfaces, etc.

In order in particular to increase properties such as the stiffness, strength, deformation reduction, and surface scratch resistance, fibrous or particulate glass fillers can be admixed to the molding compounds. As a rule, a deterioration of the optical properties, in particular of the haze and of the transparency, is observed in this process.

The approach widespread in the prior art for suppressing a deterioration of the optical properties is the adaptation of the refractive index of the glass to that of the polymer. A glass is proposed for this purpose in EP 2 169 008 A1 whose ranges of network formers, network modifiers, and intermediate oxides can be selected as so wide that the refractive index can be set in the range from 1.510 to 1.540, measured at a wavelength of 589 nm (nD). The document further describes that the refractive index to be set for the glass on the addition of the filler to the polymer should not deviate by more than 0.002 from that of the polymer.

WO 2015/132510 A1 likewise relates to transparent polyamide molding compounds reinforced with glass fillers. At least one semi-crystalline polyamide is introduced into the polyamide molding compound to set the refractive index of the molding compounds otherwise on the basis of amorphous polyamides. The polyamide molding compounds in accordance with the claims worked in the examples have glass transition temperatures of a maximum of 135° C. Higher glass transition temperatures were evidently not desired since in the discussion of the prior art problems in the processing of molding compounds, in particular with a material removal, having glass transition temperatures of >150° C. formed the subject matter.

The prior art has substantial disadvantages that should be improved by the present invention. The preparation of a glass having the accuracy of a refractive index of 0.002 thus requires a substantial technical effort with respect to a glass composition that is as exact as possible, with respect to the raw material purity, with respect to an exact melt homogeneity, and with respect to the temperature regime to be used in the glass manufacture since these factors have an influence on the refractive index of the glass. Such an effort is hardly economically sensible for glasses that only serve as material for fillers and that should be produced as inexpensively as possible if a new glass has to be prepared in each case for a specific polyamide having a specific refractive index.

Depending on the demands of a given application, there is frequently the need to vary the components of a polymer matrix to achieve a specific property profile. As a rule, however, the refractive index of the polymer thereby changes, whereby a respective glass adapted thereto would have to be prepared with the described effort to obtain reinforced molding compounds having good optical properties.

The present invention pursues the object of providing a polyamide molding compound on the basis of transparent polyamides reinforced with glass fillers having a relatively low refractive index, in particular in the range from 1.510 to 1.539. In this respect, the polyamide molding compound should have good transparency and a low haze value with simultaneously good mechanical properties. It was equally an object of the present invention to provide polyamide molding compounds having high heat deflection without the processing properties being degraded.

This object is satisfied by the polyamide molding compounds in accordance with the invention described herein that comprise or consist of the following components:

(A) 50 to 95 wt % of a mixture consisting of the polyamides (A1) and (A2), wherein
  (A1) is at least one transparent, semi-aromatic polyamide having at least 25 mol % of monomers having aromatic structural units, related to the total quantity of diamines and dicarboxylic acids in the polyamide (A1) that is amorphous or microcrystalline; and
  (A2) is at least one transparent polyamide having less than 25 mol % of monomers having aromatic structural units, related to the total quantity of diamines and dicarboxylic acids in the polyamide (A2) that is amorphous or microcrystalline;
(B) 5 to 50 wt % of at least one glass filler having a refractive index in the range from 1.510 to 1.539; and
(C) 0 to 10 wt % of at least one additive.

The following requirements must be satisfied here:

The parts by weight of the components (A) to (C) add up to 100 wt %.

The parts by weight of the components (A1) and (A2) add up to 100% of component (A).

The content of (A1) in the mixture (A) is >50 wt %, if the ratio is $\Delta 2/\Delta 1>1$ and the content of (A2) in the mixture (A) is >50 wt %, if the ratio is $\Delta 2/\Delta 1 \leq 1$ (where $\Delta 1 = n(A1) - n(B)$ and $\Delta 2 = n(B) - n(A2)$ applies.)

The transparent polyamides (A1) and (A2) have a transparency of at least 90% and a haze of at most 3%.

Mixture (A) has a transparency of at least 88% and a haze of at most 5%.

Advantageous embodiments of the polyamide molding compound in accordance with the invention are described herein.

The present invention further relates to molded bodies that comprise and preferably consist of the polyamide molding compound in accordance with the invention. These molded bodies are in particular selected from the group comprising components of cellular telephones, tablets, housings of electronic devices, trim parts in vehicles and at home, covers, visible surfaces, backlit components, shields, containers, vehicle keys, and leisure and outdoor articles.

Preferred embodiments of these molded bodies are described herein.

Definitions of Terms

Notation and Abbreviations for Polyamides and their Monomers

In the sense of the present invention, the term "polyamide" (abbreviation PA) is understood as an umbrella term; it comprises homopolyamides and copolyamides. The selected notations and abbreviations for polyamides and their monomers correspond to those set forth in the ISO standard 16396-1 (2015, (D)). The abbreviations used there are used as synonyms to the IUPAC names of the monomers in the following; the following abbreviations for monomers in particular occur: MACM for bis(4-amino-3-methylcyclohexyl)methane (also called 3,3'-dimethyl-4,4'-diaminodicyclohexylmethane, CAS #6864-37-5); PACM for bis(4-aminocyclohexyl)methane (also called 4,4'-diaminodicyclohexylmethane, CAS #1761-71-3); TMDC for bis-(4-amino-3,5-dimethylcyclohexyl)methane (also called 3,3',5,5'-tetramethyl-4,4'-diaminodicyclohexylmethane); CAS #65962-45-0); T for terephthalic acid (CAS #100-21-0); I for isopthalic acid CAS #121-95-5); BAC for 1,4-bis(aminomethyl)-cyclohexane (CAS #2549-93-1).

Indications of Quantity

The polyamide molding compounds in accordance with the present invention comprise the components (A) to (C) or preferably exclusively consist of the components (A) to (C); the requirement applies here that the components (A) to (C) add up to 100 wt % in sum. The fixed ranges of the indications of quantity for the individual components (A) to (C) are to be understood such than an arbitrary quantity for each of the individual components can be selected within the specified ranges provided that the strict provision is satisfied that the sum of all the components (A) to (C) produces 100 wt %.

Amorphous or Microcrystalline Polyamides

Amorphous or microcrystalline polyamides preferably display a melting heat of a maximum of 25 J/g, particularly preferably of a maximum of 22 J/g, very particularly preferably of 0 to 20 J/g at a heating rate of 20 K/min in dynamic differential scanning calorimetry (DSC) in accordance with ISO 11357 (2013).

Microcrystalline polyamides also have a melting point in addition to a glass transition temperature. However, they have a morphology in which the crystallites have such a small dimension that a plate manufactured therefrom is still transparent at a thickness of 2 mm, i.e. its light transmission amounts to at least 90% and its haze to at most 3%, measured in accordance with ASTM D 1003-13 (2013).

Amorphous polyamides have no melting heat or only very little melting heat or hardly detectable melting heat in comparison with the microcrystalline polyamides. The amorphous polyamides preferably display a melting heat of a maximum of 5 J/g, particularly preferably of a maximum of 3 J/g, very particularly preferably of 0 to 1 J/g at a heating rate of 20 K/min in dynamic differential scanning calorimetry (DSC) in accordance with ISO 11357 (2013).

Amorphous polyamides have no melting point due to their amorphicity.

In the sense of the present invention, semi-crystalline polyamides are those polyamides that preferably display a melting heat of more than 25 J/g, particularly preferably of at most 35 J/g, very particularly preferably of at least 40 J/g at a heating rate of 20 K/min in dynamic differential scanning calorimetry (DSC) in accordance with ISO 11357 (2013). A plate manufactured from semi-crystalline polyamides and having a thickness of 2 mm is not transparent, i.e. its light transmission is below 90% and/or its haze is above 3%, measured in each case in accordance with ASTM D 1003-13 (2013).

Transparent Polyamides

In the sense of the present invention a polyamide is transparent when its light transmission measured according to ASTM D 1003-13 (2013) at plates having a thickness of 2 mm amounts to at least 90% and when its haze amounts to at most 3%. If transparent polyamides are spoken of in the following, it is always amorphous or microcrystalline polyamides that are meant that satisfy the above definitions with respect to transparency and melting heat.

Haze, Transparency

The haze describes the scattering behavior of a substance; the the light transmission through the substance. Within the framework of the present invention, the haze or transparency is understood as the haze or transparency (total transmission) measured in accordance with ASTM D1003 on a measuring device Haze Gard Plus of the company BYK Gardner with CIE light type C at 23° C. at a molded body manufactured from the polyamide molding compound (plates of 2 mm thickness with a width and length: 60×60 mm).

Refractive Index

The refractive index is abbreviated in the formulas and in the experimental part by "n". The refractive index is always specified with respect to the glass filler, in particular glass fibers, measured at a wavelength of 589 nm. The determination of the refractive index of glass fillers, in particular of glass fibers, took place using the Beck's line method and using immersion fluids with respect to 589 nm based on method B of ISO 489(1999-04). The refractive index of the polyamides (A1) and (A2) was determined at plates of a 2 mm thickness (60×60×2 mm) at a wavelength of 589 nm and at 23° C. by means of an Abbe refractometer of Carl Zeiss in accordance with method A of ISO 489 (1999-04). 1-bromonaphthalene was used as the contact fluid.

Component (A)

The polyamide molding compound in accordance with the invention comprises 50 to 95 wt % of component (A), with respect to the sum of the components (A) to (C), with it being a mixture consisting of the polyamides (A1) and (A2). The parts by weight of the components (A1) and (A2) add up to 100% of component (A). (A1) is here at least one transparent, semi-aromatic polyamide having at least 25 mol % of monomers having aromatic structural units, related to the total quantity of diamines and dicarboxylic acids in the polyamide (A1) and is amorphous or microcrystalline. (A2) is at least one transparent, semi-aromatic polyamide having less than 25 mol % of monomers having aromatic structural units, related to the total quantity of diamines and dicarboxylic acids in the polyamide (A2) and is amorphous or microcrystalline. The polyamides (A1) and (A2) are in particular amorphous.

The proportion of the components (A1) in the mixture (A) is greater than 50 wt % when the following condition is satisfied:

$\Delta 2/\Delta 1 \geq 1$

The proportion of the components (A2) in the mixture (A) is greater than 50 wt % when the following condition is satisfied:

$\Delta 2/\Delta 1 \leq 1$

It applies here that $\Delta 1 = n(A1) - n(B)$ and $\Delta 2 = n(B) - n(A2),$ where n (A1) stands for the refractive index of the component A1;
n (A2) stands for the refractive index of the component (A2); and
n (B) stands for the refractive index of the glass filler.

The provisions further apply that the transparent polyamides (A1) and (A2) have a transparency of at least 90% and a haze of at most 3% and that the mixture (A) has a transparency of at least 88% and a haze of at most 5%.

Preferred embodiments of component (A) will be discussed in the following.

In accordance with a preferred embodiment of the present invention, component (A1) or component (A2) is amorphous; particularly preferably both components are amorphous.

In accordance with a preferred embodiment of the present invention, the proportion of component (A) in the polyamide molding compound is in the range from 55 to 90 wt %, particularly preferably 60 to 85 wt %, and in particular preferably 62 to 84.9 wt %, with respect to the total weight of the polyamide molding compound.

Another preferred embodiment of the present invention provides that the polyamide mixture (A) consists of 51 to 95 wt %, preferably 55 to 90 wt %, and in particular 60 to 85 wt % polyamide (A1) and of 5 to 49 wt %, particularly preferably 10 to 45 wt %, and in particular 15 to 40 wt % polyamide (A2) if Δ2/Δ1>1.

The polymer mixture (A) is preferably composed as follows in dependence on the ratio Δ2/Δ1 in the range Δ2/Δ1>1:

| Δ2/Δ1 | (A1) [wt %] | (A2) [wt %] |
|---|---|---|
| 1.01 to 1.25 | 51 to 60 | 40 to 49 |
| 1.26 to 1.69 | 61 to 71 | 29 to 39 |
| 1.70 to 2.30 | 72 to 82 | 18 to 28 |
| 2.31 to 20 | 83 to 95 | 5 to 17 |

In accordance with another preferred embodiment of the present invention, the polyamide mixture (A) consists of 51 to 95 wt %, preferably 55 to 90 wt %, and in particular 60 to 85 wt % polyamide (A2) and of 5 to 49 wt %, preferably 10 to 45 wt %, and in particular 15 to 40 wt % polyamide (A1) if Δ2/Δ1≤1.

The polymer mixture (A) is preferably composed as follows in dependence on the ratio Δ2/Δ1 in the range Δ2/Δ1≤1:

| Δ2/Δ1 | (A1) | (A2) |
|---|---|---|
| 0.71 to 1.00 | 41 to 49 | 51 to 59 |
| 0.29 to 0.70 | 24 to 40 | 60 to 76 |
| 0.05 to 0.28 | 5 to 23 | 77 to 95 |

It is further preferred that Δ1 and Δ2 are equal to or greater than 0.003, are particularly preferably in the range from 0.003 to 0.03, and are in particular in the range from 0.0035 to 0.025.

In accordance with a further preferred embodiment of the present invention, the transparent polyamides (A1) are made up of the following monomers:
(a-A1) 20 to 100 mol % of cycloaliphatic diamines, with respect to the total quantity of diamines;
(b-A1) 0 to 80 mol % of diamines having aromatic structural units, with respect to the total quantity of diamines;
(c-A1) 0 to 80 mol % of open-chain cycloaliphatic diamines, with respect to the total quantity of diamines;
(d-A1) 0 to 75 mol % of open-chain aliphatic dicarboxylic acids, with respect to the total quantity of dicarboxylic acids;
(e-A1) 25 to 100 mol % of aromatic dicarboxylic acids, with respect to the total quantity of dicarboxylic acids;
(f-A1) 0 to 75 mol % of cycloaliphatic dicarboxylic acids, with respect to the total quantity of dicarboxylic acids;
(g-A1) 0 to 40 wt % of lactams and/or aminocarboxylic acids having 6 to 12 carbon atoms, with respect to the total quantity of the monomers (a-A1) to (g-A1), where the sum of the diamines (a-A1), (b-A1), and (c-A1) produces 100 mol %; where the sum of the dicarboxylic acids (d-A1), (e-A1), and (f-A1) produces 100 mol %; and where the sum of the monomers (b-A1) and (e-A1) amounts to at least 25 mol %, with respect to the sum of the total diamines and of the total dicarboxylic acids in the polyamide (A1). The content of aromatic dicarboxylic acids (e-A1) is particularly preferably in the range from 50 to 100 mol %; the content of open-chain, aliphatic dicarboxylic acids (d-A1) in the range from 0 to 50 mol %; and the content of cycloaliphatic dicarboxylic acids (f-A1) in the range from 0 to 50 mol %, in each case with respect to the total quantity of dicarboxylic acids. Further preferably, the content of cycloaliphatic diamines (a-A1) is in the range from 50 to 100 mol %; the content of open-chain, aliphatic diamines (c-A1) in the range from 0 to 50 mol %; and the content of cycloaliphatic diamines (b-A1) in the range from 0 to 50 mol %, in each case with respect to the total quantity of diamines. Very particularly preferably, (A1) is free of diamines (b-A1).

In accordance with another preferred embodiment of the present invention, the transparent polyamide (A1) comprises at least 27 mol %, preferably at least 30 mol %, particularly preferably in the range from 25 to 100 mol %, 27 to 80 mol %, or 30 to 60 mol % of monomers having aromatic structural units, with respect to the total quantity of diamines and dicarboxylic acids in the polyamide (A1).

Another preferred embodiment of the present invention provides that the transparent polyamides (A2) are made up of the following monomers:
(a-A2) 20 to 100 mol % of cycloaliphatic diamines, with respect to the total quantity of diamines;
(b-A2) 0 to less than 50 mol % of diamines having aromatic structural units, with respect to the tot-Al quantity of diamines;
(c-A2) 0 to 80 mol % of open-chain aliphatic diamines, with respect to the total quantity of diamines;
(d-A2) 20 to 100 mol % of open-chain aliphatic dicarboxylic acids, with respect to the total quantity of dicarboxylic acids;
(e-A2) 0 to less than 50 mol % of aromatic dicarboxylic acids, with respect to the total quantity of dicarboxylic acids;
(f-A2) 0 to 80 mol % of cycloaliphatic dicarboxylic acids, with respect to the total quantity of dicarboxylic acids;
(g-A2) 0 to 40 wt % of lactams and/or aminocarboxylic acids having 6 to 12 carbon atoms, with respect to the total quantity of the monomers (a-A2) to (g-A2), where the sum of the diamines (a-A2), (b-A2), and (c-A2) produces 100 mol %; where the sum of the dicarboxylic acids (d-A2), (e-A2), and (f-A2) produces 100 mol %; and where the sum of the monomers (b-A2) and (e-A2) amounts to less than 25 mol %, with respect to the sum of the total diamines and of the total dicarboxylic acids in the polyamide (A2). The content of open-chain aliphatic dicarboxylic acids (d-A2) is particularly preferably in the range from 60 to 100 mol % and the content of aromatic dicarboxylic acids (e-A2) in the range from 0 to 40 mol %, in each case with respect to the total quantity of dicarboxylic acids, with (A2) being free of dicarboxylic acids (f-A2). It is further particularly preferred for the content of cycloaliphatic diamines (a-A2)

to be in the range from 60 to 100 mol % and for the content of open-chain, aliphatic diamines (c-A2) to be in the range from 0 to 40 mol %, respectively with respect to the total quantity of diamines, with (A2) being free of diamines (b-A2) and preferably being free of lactams and/or aminocarboxylic acids (g-A2).

In accordance with a further preferred embodiment of the present invention, the transparent polyamide (A2) comprises at most 23 mol %, preferably at most 20 mol %, particularly preferably in the range from 0 to 23 mol %, 0 to 20 mol %, or 0 to 15 mol % of monomers having aromatic structural units, with respect to the total quantity of diamines and dicarboxylic acids in the polyamide (A2). (A2) is very particularly preferably free of diamines (b-A2) and free of dicarboxylic acids (e-A2).

In accordance with another preferred embodiment of the present invention, the monomers having aromatic structural units for the transparent polyamides (A1) and (A2) are selected from the group comprising terephthalic acid, isophthalic acid, naphthalenedicarboxylic acid (NDA), in particular 1,5-naphthalenedicarboxylic acid and 2,6-naphthalenedicarboxylic acid, biphenyldicarboxylic acids, in particular biphenyl-2,2'-dicarboxylic acid (diphenic acid), 4,4'-diphenyldicarboxylic acid, 3,3'-diphenyldicarboxylic acid, 4,4'-diphenyl ether dicarboxylic acid, 4,4'-diphenylmethanedicarboxylic acid, and 4,4-diphenylsulfonedicarboxylic acid, 1,5-anthracene dicarboxylic acid, p-terphenylene-4,4"-dicarboxylic acid, and 2,5-pyridine dicarboxylic acid, xylylenediamine, in particular meta-xylylenediamine, and para-xylylenediamine, and mixtures thereof.

A further preferred embodiment of the present invention provides that the monomers having aromatic structures for the transparent polyamides (A1) and (A2) are selected solely from the group comprising terephthalic acid, isophthalic acid, 1,5-naphthalenedicarboxylic acid, 2,6-naphthalenedicarboxylic acid, and meta-xylylenediamine, and mixtures thereof.

Another preferred embodiment of the invention provides that the polyamide molding compound comprises exactly one polyamide (A1). In accordance with a further preferred embodiment of the present invention, the polyamide molding compound comprises exactly one polyamide (A2). It is particularly preferred that the polyamide molding compound comprises exactly one polyamide (A1) and exactly one polyamide (A2).

Another preferred embodiment of the present invention provides that the cycloaliphatic diamine (a-A1) and/or (a-A2) is/are selected from the group comprising bis(4-amino-3-methylcyclohexyl)methane (MACM), bis-(4-aminocyclohexyl)methane (PACM), bis-(4-amino-3-ethylcyclohexyl)methane, bis-(4-amino-3,5-dimethylcyclohexyl)methane, 2,6-norbornane diamine (2,6-bis-(aminomethyl)norbornane), 1,3-diaminecyclohexane, 1,4-diaminocyclohexanediamine, isophorone diamine, 1,3-bis-(aminomethyl)cyclohexane, 1,4-bis-(aminomethyl)cyclohexane, 2,2-(4,4'-diaminodicyclohexyl)propane, and mixtures thereof. The cycloaliphatic diamines (a-A1) and/or (a-A2) are particularly preferably selected from the group comprising bis(4-amino-3-methylcyclohexyl)methane (MACM) and bis-(4-aminocyclohexyl)methane (PACM), and mixtures thereof.

In accordance with another preferred embodiment of the present invention, the aromatic diamine (b-A1) and/or (b-A2) is/are selected from the group comprising xylylenediamine, in particular meta-xylylenediamine, and para-xylylenediamine, and mixtures thereof. The diamines having aromatic structural units (b-A1) and/or (b-A2) are particularly preferably selected from meta-xylylenediamine.

In accordance with another preferred embodiment, the diamine (c-A1) and/or (c-A2) is selected from the group comprising 1,4-butanediamine, 1,5-pentanediamine, 2-methyl-1,5-pentanediamine, hexanediamine, in particular 1,6-hexanediamine, 2,2,4-trimethyl-1,6-hexamethylenediamine, 2,4,4-trimethyl-1,6-hexamethylenediamine, nonanediamine, in particular 1,9-nonanediamine, 2-methyl-1,8-octanediamine, 1,10-decanediamine, 1,11-undecanediamine, 1,12-dodecanediamine, 1,13-tridecanediamine, 1,14-tetradecanediamine, 1,18-octadecanediamine, and mixtures thereof. The open-chain, aliphatic diamines (c-A1) and/or (c-A2) are particularly preferably selected from the group comprising diamines having 6 to 10 carbon atoms, in particular 1,6-hexanediamine, 1,9-nonanediamine, 1,10-decanediamine, and mixtures thereof.

A further preferred embodiment of the present invention provides that the aliphatic dicarboxylic acid (d-A1) and/or (d-A2) is selected from the group comprising 1,6-apidic acid, 1,9-nonanedioic acid, 1,10-decanedioic acid, 1,11-undecanedioic acid, 1,12 dodecanedioic acid, 1,13-tridecanedioic acid, 1,14-tetradecanedioic acid, 1,16-hexadecanedioic acid, and 1,18-octadecanedioic acid, and mixtures thereof. The open-chain, aliphatic dicarboxylic acids (d-A1) and/or (d-A2) are particularly preferably selected from the group comprising dicarboxylic acids having 6 to 12 carbon atoms, in particular 1,6-hexanedioic acid, 1,10-decanedioic acid, 1,12-dodecanedioic acid, and mixture thereof.

In accordance with a further preferred embodiment of the present invention, the aromatic dicarboxylic acid (e-A1) and/or (e-A2) are selected from the group comprising terephthalic acid, isophthalic acid, naphthalenedicarboxylic acid (NDA), in particular 1,5-naphthalenedicarboxylic acid and 2,6-naphthalenedicarboxylic acid, biphenyldicarboxylic acid, in particular biphenyl-2,2'-dicarboxylic acid, 4,4'-diphenyldicarboxylic acid, 3,3'-diphenyldicarboxylic acid, 4,4'-diphenyl ether dicarboxylic acid, 4,4'-diphenylmethanedicarboxylic acid, and 4,4'-diphenylsulfonedicarboxylic acid, 1,5-anthracene dicarboxylic acid, p-terphenylene-4,4'-dicarboxylic acid, and 2,5-pyridine dicarboxylic acid, and mixtures thereof. The aromatic dicarboxylic acids (e-A1) and/or (e-A2) are particularly preferably selected from the group comprising terephthalic acid, isophthalic acid, and mixtures thereof.

A further preferred embodiment of the present invention provides that the cycloaliphatic dicarboxylic acid (f-A1) and/or (f-A2) is/are selected from the group comprising 1,3-cyclopentanedicarboxylic acid, 1,3-cyclohexanedicarboxylic acid, 1,4-cyclohexanedicarboxylic acid, 2,3-norbornanedicarboxylic acid, 2,6-norbornanedicarboxylic acid, and mixtures thereof. The cycloaliphatic dicarboxylic acids (f-A1) and/or (f-A2) are particularly preferably selected from the group comprising 1,3-cyclohexanedicarboxylic acid and 1,4-cyclohexanedicarboxylic acid, and mixtures thereof.

In accordance with a further preferred embodiment of the present invention, the lactam and/or the α,ω-aminocarboxylic acids (g-A1) and/or (g-A2) is/are selected from the group comprising m-aminobenzoic acid, p-aminobenzoic acid, caprolactam (CL), α,ω-aminocaproic acid, α,ω-aminoheptanoic acid, α,ω-aminooctanoic acid, α,ω-aminononanoic acid, α,ω-aminodecanoic acid, α,ω-aminoundecanoic acid (AUA), laurolactam (LL), and α,ω-aminododecanoic acid (ADA); caprolactam, α,ω-aminocaproic acid, laurolactam, α,ω-aminoundecanoic acid, and α,ω-aminododecanoic acid, and mixtures thereof are particularly preferred. The lactams and/or aminocarboxylic acids (g-A1) and/or (g-A2) are preferably selected from the group comprising caprolactam, aminocaproic acid, aminoundecanoic acid, laurolactam, and aminododecanoic acid, and mixtures thereof.

A further preferred embodiment of the present invention provides that the cycloaliphatic diamine (a-A1) and/or (a-A2) is selected from the group comprising bis(4-amino-3-methylcyclohexyl)methane, bis-(4-aminocyclohexyl) methane, bis-(4-amino-3-ethylcyclohexyl)methane, bis-(4-amino-3,5,-dimethylcyclohexyl)methane, 2,6-norbornane diamine, 1,3-diaminecyclohexane, 1,4-diaminocyclohexanediamine, isophorone diamine, 1,3-bis-(aminomethyl)cyclohexane, 1,4-bis-(aminomethyl)cyclohexane, 2,2-(4,4'-diaminodicyclohexyl)propane, and mixtures thereof and the aromatic diamine (b-A1) and/or (b-A2) is/are selected from the group comprising xylylenediamine, in particular meta-xylylenediamine and para-xylylenediamine, and mixtures thereof, and the diamine (c-A1) and/or (c-A2) is/are selected from the group comprising hexanediamine, in particular 1,6-hexanediamine, nonanediamine, in particular 1,9-nonanediamine, 1,10-decanediamine, 1,11-undecanediamine, 1,12-dodecanediamine, 1,13-tridecanediamine, 1,14-tetradecanediamine, 1,18-octadecanediamine, and mixtures thereof, and the aliphatic dicarboxylic acid (d-A1) and/or (d-A2) is selected from the group comprising 1,6-hexanedioic acid, 19,-nonanedioic acid, 1,10-decanedioic acid, 1,11-undecanedioic aic, 1,12-dodecanedioic acid, 1,13-tridecanedioic acid, 1,14-tetradecanedioic acid, 1,16-hexadecanedioic acid, 1-18, octadecanedioic acid, and mixtures thereof, and the aromatic dicarboxylic acid (e-A1) and/or (e-A2) is/are selected from the group comprising terephthalic acid, isopththalic acid, naphthalenedicarboxylic acid (NDA), in particular 1,5-naphthalenedicarboxylic acid and 2,6-naphthalenedicarboxylic acid, biphenyldicarboxylic acids, in particular biphenyl-2,2'-dicarboxylic acid, 4,4'-diphenyldicarboxylic acid, 3,3'-diphenyldicarboxylic acid, 4,4'-diphenyl ether dicarboxylic acid, 4,4'-diphenylmethanedicarboxylic acid, and 4,4'-diphenylsulfonedicarboxylic acid, 1,5-anthracenedicarboxylic acid, p-terephenylene-4,4"-dicarboxylic acid, and 2,5-pyridinedicarboxylic acid, and mixtures thereof, and the cycloaliphatic dicarboxylic acid (f-A1) and/or (f-A2) is/are selected from the group comprising 1,3-cyclohexanedicarboxylic acid, 1,4-cyclohexanedicarboxylic acid, and mixtures thereof, and the lactam and/or the α,ω-aminocarboxylic acids (g-A1) and/or (g-A2) is/are selected from the group comprising m-aminobenzoic acid, p-aminobenzoic acid, caprolactam (CL), α,ω-aminocaproic acid, α,ω-aminoheptanoic acid, α,ω-aminooctanoic acid, α,ω-aminononanoic acid, α,ω-aminodecanoic acid, α,ω-aminoundecanoic acid (AUA), laurolactam (LL), and α,ω-aminododecanoic acid (ADA); caprolactam, α,ω-aminocaproic acid, laurolactam, α,ω-aminoundecanoic acid, and α,ω-aminododecanoic acid, and mixtures thereof are particularly preferred.

The cycloaliphatic diamines (a-A1) are particularly preferably selected from the group comprising bis-4(-amino-3-methylcyclohexyl)methane (MACM) and bis(4-aminocyclohexyl)methane (PACM) and mixtures thereof and the diamines having aromatic structural units (b-A1) are selected from the group comprising meta-xylylenediamine and para-xylylenediamine and mixtures thereof, and the open-chain, aliphatic diamines (c-A1) are selected from the group comprising diamines having 6 to 10 carbon atoms, in particular 1,6-hexanediamine, 1,9-nonanediamine, 1,10-decandediamine, and mixtures thereof, and the open-chain aliphatic dicarboxylic acids (d-A1) are selected from the group comprising dicarboxylic acids having 6 to 12 carbon atoms, in particular 1,6-hexanedioic acid, 1,10-decanedioic acid, 1,12-dodecanedioic acid, and mixtures thereof, and the aromatic dicarboxylic acids (e-A1) are selected from the group comprising terephthalic acid, isophthalic acid, and mixtures thereof, and the cycloaliphatic dicarboxylic acids (f-A1) are selected from the group comprising 1,3-cyclohexanedicarboxylic acid and 1,4-cyclohexanedicarboxylic acid, and mixtures thereof, and the lactams and/or aminocarboxylic acids (g-A1) are selected from the group comprising caprolactam, aminocaproic acid, aminoundecanoic acid, laurolactam, and aminododecanoic acid, and mixtures thereof.

The cycloaliphatic diamines (a-A2) are further particularly preferably selected from the group comprising bis-4(-amino-3-methylcyclohexyl)methane (MACM) and bis(4-aminocyclohexyl)methane (PACM) and mixtures thereof and the diamines having aromatic structural units (b-A2) are selected from the group comprising meta-xylylenediamine and para-xylylenediamine and mixtures thereof, and the open-chain, aliphatic diamines (c-A2) are selected from the group comprising diamines having 6 to 10 carbon atoms, in particular 1,6-hexanediamine, 1,9-nonanediamine, 1,10-decandediamine, and mixtures thereof, and the open-chain aliphatic dicarboxylic acids (d-A2) are selected from the group comprising dicarboxylic acids having 6 to 12 carbon atoms, in particular hexanedioic acid, 1,10-decanedioic acid, 1,12-dodecanedioic acid, and mixtures thereof, and the aromatic dicarboxylic acids (e-A2) are selected from the group comprising terephthalic acid, isophthalic acid, and mixtures thereof, and the cycloaliphatic dicarboxylic acids (f-A2) are selected from the group comprising 1,3-cyclohexanedicarboxylic acid and 1,4-cyclohexanedicarboxylic acid, and mixtures thereof, and the lactams and/or aminocarboxylic acids (g-A2) are selected from the group comprising caprolactam, aminocaproic acid, aminoundecanoic acid, laurolactam, and aminododecanoic acid, and mixtures thereof.

In accordance with a further preferred embodiment of the present invention, the polyamide (A1) is selected from the group comprising PA MACMI/12, PA MACMI/1012, PA MACMT/12, PA MACMI/MACMT/12, PA MACMI/MACMT, PA MACMI/MACMT/MACM12, PA 6I/6T/MACMI/MACMT, PA 6I/6T/MACMI/MACMT/12, PA 6I/MACMI, PA 6I/6T/PACMI/PACMT, PA 6I/612/MACMI/MACM12, PA 6T/612/MACMT/MACM12, PA 6I/6T/612/MACMI/MACMT/MACM12, PA 6I/6T/MACMI/MACMT/PACMI/PACMT, PA 6I/6T/MACMI/MACMT/PACM I/PACMT/12, PA MACMI/MACMT/MACM36, PA MACMI/MACM36, PA MACMT/MACM36, PA 12/PACMI, PA 12/MACMT, PA 6/PACMT, PA 6/PACMI, PA MXDI, PA MXDI/MXD6, PA MXDI/MXD10, PA MXDI/MXDT, PA MXDI/MACMI, PA MXDI/MXDT/MACMI/MACMT, PA 6I/6T/BACI/BACT, PA MACMI/MACMT/BACI/BACT, PA 6I/6T/MACMI/MACMT/BACI/BACT and mixtures thereof, wherein these polyamides comprise at least 25 mol % of monomers having aromatic structural units, with respect to the total quantity of diamines and dicarboxylic acids.

Another preferred embodiment of the present invention provides that the polyamide (A2) is selected from the group PA MACM9, PA MACM10, PA MACM11, PA MACM12, PA MACM13, PA MACM14, PA MACM15, PA MACM16, PA MACM17, PA MACM18, PA MACM36, PA PACM9, PA PACM10, PA PACM11, PA PACM12, PA PACM13, PA PACM14, PA PACM15, PA PACM16, PA PACM17, PA PACM18, PA PACM36, PA TMDC9, PA TMDC10, PA TMDC11, PA TMDC12, PA TMDC13, PA TMDC14, PA TMDC15, PA TMDC16, PA TMDC17, PA TMDC18, PA TMDC36 or copolyamides such as PA MACM10/1010, PA MACM10/PACM10, PA MACM12/1012, PA MACM14/1014, PA PACM10/1010, PA PACM12/1012, PA PACM14/1014, PA MACM12/PACM12, PA MACM14/PACM14, PA MACMI/MACM12, PA MACMT/MACM12, PA MACMI/MACMT/MACM12, PA MACMI/MACMT/10/10T/1012, PA 6I/6T/612/MACMI/MACMT/MACM12, PA 6I/6T/612/PACMI/PACMT/PACM12, PA 6I/612/MACMI/MACM12, PA 6T/612/MACMT/MACM12, PA 10T/1012/MACMT/MACM12, PA 10I/1012/MACMI/MACM12, PA 6I/6T/MACMI/MACMT/PACMI/PACMT/MACM12/PACM12, PA MACMI/PACMI/MACM12/PACM12, PA MACMT/PACMT/MACM12/PACM12, PA MACMI/PACMT/MACM12/PACM12, PA MACMI/MACM36, PA MACMI/MACMT/MaCM36, PA 1012/MACMI, PA 1012/MACMT, 1010/MACMI, PA 1010/MACMT, PA 612/MACMT, PA 610/MACMT, PA 612/MACMI, PA 610/MACMI, PA 1012/PACMI, PA 1012/PACMT, PA 1010/PACMI, PA 1010/PACMT, PA 612/PACMT, PA 612/PACMI, PA 610/PACMT, PA 610/PACMI and mixtures thereof, wherein these polyamides comprise less than 25 mol % of monomers having aromatic structural units, with respect to the total quantity of diamines and dicarboxylic acids.

The polyamide mixture (A) particularly preferably comprises or consists of the following combinations of the polyamides (A1) and (A2):
polyamide (A1) PA MACMI/MACMT/12 and polyamide (A2) PA MACM12 or
polyamide (A1) PA MACMI/MACMT/12 and polyamide (A2) PA MACM10 or
polyamide (A1) PA MACMI/MACMT/12 and polyamide (A2) PA MACM14 or
polyamide (A1) PA MACMI/MACMT/12 and polyamide (A2) PA PACM10 or
polyamide (A1) PA MACMI/MACMT/12 and polyamide (A2) PA PACM14 or
polyamide (A1) PA MACMI/MACMT/12 and polyamide (A2) PA MACM12 or
polyamide (A1) PA MACMI/12 and polyamide (A2) PA MACM12 or
polyamide A1 PA 6I/6T/MACMI/MACMT/MACM12 and polyamide (A2) PA MACM12.

In accordance with a further preferred embodiment of the present invention, component (A1) has a glass transition temperature determined in accordance with ISO 11357-2 of at least 135° C., preferably at least 140° C., particularly preferably 145° C., and in particular preferably 150° C.

Another preferred embodiment of the present invention provides that component (A2) has a glass transition temperature determined in accordance with ISO 11357-2 of at least 135° C., preferably at least 140° C., particularly preferably 145° C., and in particular preferably 150° C.

In accordance with a further preferred embodiment of the present invention, the mixture (A) has a glass transition temperature determined in accordance with ISO 11357-2 of at least 130° C., preferably at least 135° C., particularly preferably 140° C., and in particular preferably 145° C.

A further preferred embodiment of the present invention provides that the component (A1) has a glass transition temperature determined in accordance with ISO 11357-2 of at least 135° C., preferably at least 140° C., particularly preferably 145° C., and in particular preferably 150° C. and the component (A2) has a glass transition temperature determined in accordance with ISO 11357-2 of at least 135° C., preferably at least 140° C., particularly preferably 145° C., and in particular preferably 150° C. and the mixture (A) has a glass transition temperature determined in accordance with ISO 11357-2 of at least 130° C., preferably at least 135° C., particularly preferably 140° C., and in particular preferably 145° C.

In accordance with a further preferred embodiment of the present invention, the polyamide molding compound has a glass transition temperature determined in accordance with ISO 11357-2 of at least 130° C., preferably at least 135° C., particularly preferably 140° C., and in particular preferably 145° C.

In accordance with another preferred embodiment of the present invention, the polyamides (A1) and/or (A2) comprise at most 30 wt %, particularly preferably at most 20 wt % of lactams and aminocarboxylic acids; they are in particular free of lactams and aminocarboxylic acids, in particular free of aminoundecanoic acid.

In accordance with another preferred embodiment of the present invention, the at least one polyamide (A2) is free of monomers having aromatic structural units and/or free of lactams and aminocarboxylic acids, in particular free of aminoundecanoic acid.

The components (A1) and (A2) preferably have a relative viscosity, measured in accordance with ISO 307 (2007) in a solution of 0.5 g polymer in 100 ml m-cresol at 20° C., in the range from 1.35 to 2.40, particularly preferably from 1.40 to 1.90, and very particular preferably from 1.42 to 1.80.

Component (B)

The molding compound in accordance with the invention comprises as a component (B) at least one glass filler.

The glass filler (B) is preferably included in the polyamide molding compound at 10 to 40 wt %, particularly preferably at 15 to 35 wt % and very particularly preferably at 15 to 30 wt %, with these indications of quantity relating to the polyamide molding compound resulting at 100 wt % from the components (A), (B), and (C).

The glass filler is preferably selected from the group comprising glass fibers, ground glass fibers, glass particles, glass flakes, glass spheres, hollow glass spheres, or comprising combinations of the aforesaid. Combinations of fillers are preferably only used when the refractive indices do not differ between the filler categories.

If glass spheres or glass particles are selected as the glass filler (B), their mean diameter amounts to 0.3 to 100 µm, preferably 0.7 to 30 µm, particularly preferably 1 to 10 µm.

The at least one glass filler (B) preferably has a refractive index, measured at a wavelength of 589 nm, of 1.511 to 1.538, preferably of 1.513 to 1.535, and in particular of 1.515 to 1.530.

A preferred embodiment of the present invention provides that the glass type of the at least one glass filler (B) is selected from the group comprising S-glass, A-glass and C-glass, in particular S-glass, and mixtures of glass having substantially the same refractive index. The term "substantially the same refractive index" is understood in that the difference in the refractive index of the glass species forming the mixture is ≤0.01, preferably ≤0.005.

A preferred embodiment provides that the glass filler (component (B)) has the following composition: 61 to 75 wt %, in particular 62 to 72 wt %, silica, 0 to 25 wt %, in particular 20 to 25 wt %, alumina, 5 to 15 wt %, in particular 6 to 12 wt %, calcium oxide and/or magnesium oxide, 0 to 6 wt % boron oxide, and 0 to 20 wt % further components such as metal oxides of sodium, potassium, lithium, titanium, zinc, zirconium, iron. It is in particular preferred if the glass filler is free of calcium oxide and if the magnesium oxide content is in the range from 8 to 11 wt %.

Preferred glass fillers in accordance with the present invention are glass fibers.

In accordance with another preferred embodiment, component (B) comprises A-glass fibers and particularly preferably consists thereof. A-glass fibers comprise 63 to 72% silica, 6 to 10% calcium oxide, 14 to 16% sodium oxide and potassium oxide, 0 to 6% alumina, 0 to 6% boron oxide, and 0 to 4% magnesium oxide. Further components such as fluorine, titanium oxide and iron oxide can be present in quantities of 0 to 2 wt %.

Another preferred embodiment provides that component (B) comprises and particularly preferably consists of C-glass fibers. C-glass fibers comprise 64 to 68% silica, 11 to 15% calcium oxide, 7 to 10% sodium oxide and potassium oxide, 3 to 5% alumina, 4 to 6% boron oxide, and 2 to 4% magnesium oxide. Further components such as barium oxide and iron oxide can be present in quantities of 0 to 2 wt %.

Component (B) is a high strength glass fiber or so-called S-glass fiber in accordance with a preferred embodiment. This is preferably based on the ternary system silica-alumina-magnesium oxide or on the quaternary system silica-alumina-magnesium oxide-calcium oxide, with a composition of 58 to 70 wt % silica ($SiO_2$), 15 to 30 wt % alumina ($Al_2O_3$), 5 to 15 wt % magnesium oxide (MgO), 0 to 10 wt % calcium oxide (CaO), and 0 to 2 wt % further oxides such as zirconia ($ZrO_2$), boron oxide ($B_2O_3$), titanium dioxide ($TiO_2$), iron oxide ($Fe_2O_3$), sodium oxide, potassium oxide, or lithium oxide ($Li_2O$) being preferred.

In accordance with a further preferred embodiment, the high strength glass fiber has a composition of 60 to 67 wt % silica ($SiO_2$), 20 to 28 wt % alumina ($Al_2O_3$), 7 to 12 wt % magnesium oxide (MgO), 0 to 9 wt % calcium oxide (CaO), and 0 to 1.5 wt % further oxides such as zirconia ($ZrO_2$), boron oxide ($B_2O_3$), titanium dioxide ($TiO_2$), iron oxide ($Fe_2O_3$), sodium oxide, potassium oxide, or lithium oxide ($Li_2O$).

It is in particular preferred if the high strength glass fiber has the following composition: 62 to 66 wt % silica ($SiO_2$), 22 to 27 wt % alumina ($Al_2O_3$), 8 to 12 wt % magnesium oxide (MgO), 0 to 5 wt % calcium oxide (CaO), 0 to 1 wt % further oxides such as zirconia ($ZrO_2$), boron oxide ($B_2O_3$), titanium dioxide ($TiO_2$), iron oxide ($Fe_2O_3$), sodium oxide, potassium oxide, or lithium oxide ($Li_2O$).

The high strength glass fibers (S-glass fibers) preferably have a tensile strength of at least 3700 MPa, preferably of at least 3800 or 4000 MPa and/or an elongation at break of at least 4.8%, preferably of at least 4.9 or 5.0% and/or a modulus of elasticity of more than 75 GPa, preferably of more than 78 or 80 GPa, with these three glass properties being determined at single fibers (pristine single filaments) having a diameter of 10 μm and a length of 12.7 mm at a temperature of 23° C. and at a relative humidity of 50%.

Specific examples for these high strength glass fibers are S-glass fibers of Owens Corning having 995 black wash, T-glass fibers of Nittobo, HiPertex of 3B, HS4 glass fibers of Sinoma Jinhing Fiberglass, R-glass fibers of Vetrotex, and S-1 and S-2 glass fibers of AGY.

The above-named glass fibers can be present in the form of short fibers, preferably in the form of cut glass product having a length in the range from 0.2 to 20 mm, or in the form of rovings. The glass fibers furthermore preferably have a circular or non-circular cross-sectional area.

Glass fibers having a circular cross-section, that is, round glass fibers, typically have a diameter in the range from 5 to 20 μm, preferably in the range from 6 to 17 μm, and particularly preferably in the range from 6 to 13 μm. They are preferably used as short glass fibers (cut glass product having a length of 0.2 to 20 mm, preferably 2 to 12 mm).

With flat glass fibers, that is, glass fibers having a non-circular cross-sectional area, they are preferably used with a dimensional ratio of the main cross-sectional axis to the secondary cross-sectional axis perpendicular thereto of more than 2, preferably of 2 to 8, in particular of 2.5 to 5.0. These so-called flat glass fibers have an oval cross-sectional area, an elliptical cross-sectional area, an elliptical cross-sectional surface provided with constriction(s) (so-called "cocoon" fibers), polygonal, rectangular or almost rectangular cross-sectional surface.

A further characterizing feature of the flat glass fibers used is that the length of the main cross-sectional axis preferably lies in the range from 6 to 40 μm, in particular in the range from 15 to 30 μm, and the length of the secondary cross-sectional axis lies in the range from 3 to 20 μm, in particular in the range from 4 to 10 μm. The flat glass fibers here have a packing density that is as high as possible, i.e. the cross-sectional area of the glass fibers fills an imaginary rectangle surrounding the glass fiber cross-section as exactly as possible at at least 70%, preferably at least 80%, and in particularly preferably at at least 85%.

The glass fibers are preferably provided with a black wash that is suitable for the respective thermoplastic, in particular for polyamide, for example comprising a bonding agent on the basis of an aminosilane compound or an epoxysilane compound.

The glass fibers used as a roving in accordance with a further preferred embodiment have a diameter of 8 to 20 μm, preferably of 12 to 18 μm, with the cross-section of the glass fibers being able to be round, oval, elliptical, elliptically provided with constriction(s), polygonal, rectangular, or almost rectangular.

Component (C)

The polyamide molding compound in accordance with the invention furthermore comprises from 0 to 10 wt % of the component (C), with respect to the sum of the components (A) to (C).

In accordance with a preferred embodiment of the present invention, the proportion of component (C) in the polyamide molding compound is in the range from 0 to 7 wt %, particularly preferably 0 to 5 wt %, and particularly preferably 0.1 to 3.0 wt %, in each case with respect to the sum of the components (A) to (C).

A further preferred embodiment provides that the at least one additive (C) is selected from the group comprising inorganic and organic stabilizers, in particular antioxidants, antiozonants, heat stabilizers, light protection means, UV stabilizers, UV absorbers, or UV blockers, monomers, in particular lactams, plasticizers, up to less than 5 wt % with respect to the total mass of the polyamide molding compound of semi-crystalline polyamides, in particular polyamide PA 12, impact modifiers, lubricants, colorants, marking means, photochromic agents, demolding means, condensation catalysts, chain regulators, in particular monofunctional carboxylic acids or amines, anti-foaming agents, anti-blocking agents, optical brighteners, non-halogen flame retardants, natural sheet silicates, synthetic sheet silicates, nanoscale fillers having a particle size of a maximum of 100 nm, and mixtures thereof.

The use of additives to component (C) must in particular be given special attention with respect to the obtaining of transparency. Only those additives may preferably be introduced into the molding compound that have no negative effects or only small negative effects on the transmission and on the haze of the molding compound. The molding compound in accordance with the invention here preferably only comprises the following components (C) selected from the group comprising inorganic and organic stabilizers, in particular antioxidants, antiozonants, heat stabilizers, light protection means, UV stabilizers, UV absorbers or UV blockers, monomers, lubricants, colorants, marking means, demolding means, condensation catalysts, chain regulators, in particular monofunctional carboxylic acids or amines, anti-foaming agents, anti-blocking agents, optical brighteners, in a quantity of 0.1 to 3.0 wt %, with respect to the sum of components (A) to (C).

Polyamide Molding Compound

A preferred embodiment of the present invention provides that the proportion of component (A) in the polyamide molding compound is in the range from 55 to 90 wt %, preferably 60 to 85 wt %, and particularly preferably 62 to 84.9 wt %, with respect to the sum of the components (A) to (C), and the proportion of component (B) in the polyamide molding compound is in the range from 10 to 40 wt %, preferably 15 to 35 wt %, and particularly preferably 15 to 30 wt %, with respect to the sum of the components (A) to (C), and the proportion of component (C) in the molding compound is in the range from 0 to 7 wt %, preferably 0 to 5 wt %, and particularly preferably 0.1 to 3.0 wt %, with respect to the sum of the components (A) to (C).

Another preferred embodiment of the present invention further provides that the polyamide molding compound does not have any other components than the components (A) to (C).

In accordance with another preferred embodiment of the present invention, the transparency measured in accordance with ASTM D1003 at a molded body (plate with the dimension 60×60×2 mm) produced from the polyamide molding compound amounts to at least 80%, preferably at least 85%, and particularly preferably at least 88%.

In accordance with another preferred embodiment of the present invention, the transparency measured in accordance with ASTM D 10003 at a molded body (plate with a dimension 60×60×2 mm) containing 20 wt % glass filler B, preferably in the form of glass fibers, in particular in the form of S-glass fibers, amounts to at least 80%, preferably at least 85%, and particularly preferably at least 88%.

A further preferred embodiment provides that the haze measured in accordance with ASTM D1003 at a molded body (plate with the dimension 60×60×2 mm) produced from the polyamide molding compound amounts to a maximum of 40%, preferably a maximum of 35%, particularly preferably to a maximum of 25% and very particularly preferably a maximum of 20%.

Another preferred embodiment provides that the haze measured in accordance with ASTM D 10003 at a molded body made from polyamide molding compound (plate with a dimension 60×60×2 mm) containing 20 wt % glass filler (B), preferably in the form of glass fibers, in particular in the form of S-glass fibers, amounts to a maximum of 30%, preferably a maximum of 25%, particularly preferably a maximum of 20%, and very particularly preferably a maximum of 15%.

In accordance with another preferred embodiment of the present invention, the arithmetical mean roughness Ra determined at a molded body (plate with the dimension 60×60×2 mm) produced from the polyamide molding compound in accordance with DIN EN ISO 4287 (2010-07) by means of a MarSurf XR1 Surface Measuring Station amounts to at most 0.12 µm, preferably at most 0.09 µm, particularly preferably from 0.01 to 0.10 µm, in particular from 0.02 to 0.09 µm, and/or the surface roughness $R_z$ amounts to at most 1.50 µm, preferably at most 1.00 µm, particularly preferably from 0.05 to 1.30 µm, in particular from 0.1 to 1.00 µm.

In accordance with another preferred embodiment of the present invention, the arithmetical mean roughness Ra determined at a molded body (plate with the dimension 60×60×2 mm) produced from the polyamide molding compound and comprising 20 wt % glass filler (B), preferably in the form of glass fibers, in particular in the form of E-glass fibers, in accordance with DIN EN ISO 4287 (2010-07) by means of a MarSurf XR1 Surface Measuring Station amounts to at most 0.1 µm, preferably at most 0.07 µm, particularly preferably from 0.01 to 0.08 µm, in particular from 0.02 to 0.06 µm, and/or the surface roughness $R_z$ amounts to at most 1.5 µm, preferably at most 0.85 µm, preferably from 0.05 to 1.0 µm, in particular from 0.1 to 0.9 µm.

In accordance with a further preferred embodiment of the present invention the transparency measured in accordance with ASTM D1003 at a molded body (plate with the dimension 60×60×2 mm) produced from the polyamide molding compound amounts to at least 80%, preferably at least 88% and the haze measured in accordance with ASTM D1003 at a molded body (plate with the dimension 60×60×2 mm) produced from the polyamide molding compound amounts to a maximum of 40%, preferably a maximum of 35%, particularly preferably to a maximum of 25% and very particularly preferably a maximum of 20%, and the arithmetical mean roughness Ra determined at a molded body (plate with the dimension 60×60×2 mm) produced from the polyamide molding compound and comprising 20 wt % glass filler (B), preferably in the form of glass fibers, in particular in the form of E-glass fibers, in accordance with DIN EN ISO 4287 (2010-07) by means of a MarSurf XR1 Surface Measuring Station amounts to at most 0.12 µm, preferably at most 0.09 µm, particularly preferably from 0.01 to 0.10 µm, in particular from 0.02 to 0.09 µm, and/or the surface roughness $R_z$ amounts to at most 1.50 µm, preferably at most 1.00 µm, preferably from 0.05 to 1.30 µm, in particular from 0.10 to 1.00 µm In accordance with a further preferred embodiment of the present invention, the transparency measured at a molded body (plate with the dimension 60×60×2 mm) produced from the polyamide molding compound and comprising 20 wt % glass fillers (B), preferably in the form of glass fibers, in particular in the form of S-glass fibers, in accordance with ASTM D1003 amounts to at least 80%, preferably at least 85%, and particularly preferably at least 88% and the haze measured at a molded body (plate with the dimension 60×60×2 mm) produced from the polyamide molding compound and comprising 20 wt % glass fillers (B), preferably in the form of glass fibers, in particular in the form of S-glass fibers, in accordance with ASTM D1003 amounts to a maximum of 30%, preferably to a maximum of 25%, particularly preferably a maximum of 20%, and very particularly preferably a maximum of 15% and the arithmetical mean roughness Ra determined at a molded body (plate with the dimension 60×60×20 mm) produced from the polyamide molding compound and comprising 20 wt % glass fillers (B), preferably in the form of glass fibers, in particular in the form of S-glass fibers in accordance with DIN EN ISO 4287 (2010-07) by means of a MarSurf XR1 Surface Measuring Station amounts to at most 0.1 µm, preferably at most 0.07 µm, particularly preferably from 0.01 to 0.08 µm, in particular from 0.02 to 0.06 µm, and/or the determined surface roughness Rz amounts to at most 1.5 µm, preferably at most 0.85 µm, particularly preferably from 0.05 to 1.0 µm, in particular from 0.1 to 0.9 µm.

Another preferred embodiment of the invention provides that the modulus of elasticity of the polyamide molding compound determined in accordance with ISP 527 is in the range from 3,000 to 15,000 MPa, preferably from 5,000 to 12,000 MPa, and particularly preferably from 5,500 to 10,000 MPa.

In accordance with another preferred embodiment of the present invention, the failure stress of the polyamide molding compound determined in accordance with ISO 527 amounts to greater than 80 MPa, preferably to from 100 to 250 MPa, and particularly preferably to from 120 to 200 MPa.

In accordance with a further preferred embodiment of the present invention, the elongation at break of the polyamide molding compound determined in accordance with ISO 527 is greater than 2%, preferably greater than 3%, and particularly preferably in the range from 3 to 10%.

In accordance with another preferred embodiment of the present invention, the impact resistance of the polyamide molding compound determined in accordance with ISO 179/2 is preferably than 30 kJ/mm$^2$, preferably greater than 40 kJ/mm$^2$, and particularly preferably from 40 to 100 kJ/mm$^2$.

In accordance with a further preferred embodiment of the present invention, the notch impact strength of the polyamide molding compound determined in accordance with ISO 179/2 amounts to at least 8 kJ/mm$^2$, preferably to at least 9 kJ/mm$^2$, and particularly preferably from 10 to 20 kJ/mm$^2$.

In accordance with a further preferred embodiment of the present invention, the HDT A of the polyamide molding compound determined in accordance with ISO 75 amounts to at least 120° C., particularly preferably to at least 130° C., and very particularly preferably at least 140° C., and is preferably in the range from 120 to 200° C., particularly preferably from 130 to 180° C., and very particularly preferably from 140 to 160° C.

In accordance with a further preferred embodiment of the present invention, the HDT B of the polyamide molding compound determined in accordance with ISO 75 amounts to at least 125° C., particularly preferably to at least 135° C., and very particularly preferably at least 145° C., and is preferably in the range from 125 to 200° C., particularly preferably from 135 to 190° C., and very particularly preferably from 145 to 170° C.

In accordance with another preferred embodiment of the present invention, the polyamide molding compound is free of lactams and aminocarboxylic acids, in particular free of aminoundecanoic acid. It is further preferred that the polyamide molding compound is free of polyetheramides.

A preferred polyamide molding compound in accordance with the present invention comprises the following components and particularly preferably consists thereof:
(A) 50 to 95 wt % of a mixture of
  (A1) 25 to 48% polyamide PA MACMI/MACMT/12;
  (A2) 52 to 75% polyamide PA MACM12;
(B) 5 to 50 wt % of at least one glass filler having a refractive index in the range from 1.510 to 1.539;
(C) 0 to 10 wt % of at least one additive.

It is in particular preferred that for this composition A1 and A2 are in the range from 0.003 to 0.03.

Furthermore, preferred polyamide molding compounds in accordance with the present invention are those molding compounds that comprise or consist of the following components:
(A) 50 to 95 wt % of a mixture of
  (A1) 25 to 48% polyamide PA MACMI/12;
  (A2) 52 to 75% polyamide PA MACM12;
(B) 5 to 50 wt % of at least one glass filler having a refractive index in the range from 1.510 to 1.539;
(C) 0 to 10 wt % of at least one additive, or
(A) 50 to 95 wt % of a mixture of
  (A1) 25 to 45% polyamide 6I/6T/612/MACMI/MACMT/MACM12;
  (A2) 55 to 75% polyamide PA MACM12;
(B) 5 to 50 wt % of at least one glass filler having a refractive index in the range from 1.510 to 1.539;
(C) 0 to 10 wt % of at least one additive,
or
(A) 50 to 95 wt % of a mixture of
  (A1) 25 to 45% polyamide PA MACMI/MACMT/12;
  (A2) 55 to 75% polyamide PA MACM12/PACM12;
(B) 5 to 50 wt % of at least one glass filler having a refractive index in the range from 1.510 to 1.539;
(C) 0 to 10 wt % of at least one additive,
or
(A) 50 to 95 wt % of a mixture of
  (A1) 25 to 45% polyamide PA MACMI/MACMT/12;
  (A2) 55 to 75% polyamide PA MACM14/PACM14;
(B) 5 to 50 wt % of at least one glass filler having a refractive index in the range from 1.510 to 1.539;
(C) 0 to 10 wt % of at least one additive.

It is in particular preferred that for these compositions A1 and A2 are in the range from 0.003 to 0.03.

Molded Bodies

The present invention further relates to molded bodies comprising the molding compound as defined above; the molded body preferably consists of this polyamide molding compound. These molded bodies are in particular selected from the group comprising components of cellular telephones, tablets, housings of electronic devices, trim parts in vehicles and at home, covers, visible surfaces, backlit components, shields, containers, vehicle keys, and leisure and outdoor articles.

In accordance with a preferred embodiment of the present invention, the molded bodies are multilayer. It is in particular a two-layer or three-layer molded body that preferably comprises only one layer formed of the previously described molding compound in accordance with the invention.

It is preferably a multilayer molded body formed from a layer (S1) comprising or consisting of the polyamide molding compound in accordance with the invention and at least one further layer (S2), (S3), or (S4) that is free of glass fillers (B) or that has a proportion of glass filler (B) reduced in comparison with the layer (S1), with the glass filler proportion preferably being reduced by at least 50 wt % with respect to the layer (S1).

These multilayer molded bodies make possible a good surface quality even with the use of transparent polyamides of a high viscosity as a component of the mixture (A) and/or the use of molding compounds having a higher degree of filling of glass fillers (B) in the layer (S1). In addition, the tool surface has a smaller influence on the surface quality so that a good surface quality can nevertheless be implemented even with actually suboptimal tool surfaces. This reduces the surface roughness and the haze of the molded body and increases its transparency, and indeed at high stiffness and strength, which is substantially ensured by the layer (S1). Thus these multilayer molded bodies can have a haze at a total thickness of 2 mm of less than 10% and a transparency of more than 90%, which demonstrates the excellent optical properties of this multilayer system. A very resistant layer (S2), (S3), or (S4) can furthermore provide the multilayer molded body with an overall better chemical resistance because the possibly less resistant layer (S1) is not in direct contact with the chemicals present. In this connection, with a suitable choice of the outwardly disposed layers (S2) to (S4), a multilayer molded body having good stress cracking resistance and good chemical resistance can be obtained. The resistance toward media and the transparency and the haze can thus be increased without suffering large compromises in the mechanical properties.

In accordance with another preferred embodiment, the molded body has an arithmetical mean roughness Ra of at most 0.1 μm, preferably of 0.01 to 0.08 μm, in particular of 0.02 to 0.06 μm, and/or a surface roughness $R_z$ of at most 1.5 μm, preferably of 0.05 to 1.0 μm, in particular from 0.1 to 0.9 μm, respectively determined in accordance with DIN EN ISO 4287 (2010-07) by means of a MarSurf XR1 Surface Measuring Station.

In accordance with a further preferred embodiment of the present invention, the transparency measured in accordance with ASTM D100 at a multilayer molded body (plate with the dimension 60×60×2 mm) produced from the polyamide molding compound and comprising 20 wt % glass fillers (B), preferably in the form of glass fibers, in particular in the form of E-glass fibers, in the layer (S1) amounts to at least 80%, preferably at least 85%, and particularly preferably at least 88% and the haze measured in accordance with ASTM D1003 amounts to a maximum of 25%, preferably to a maximum of 20%, particularly preferably to a maximum of 15%, and very particularly preferably to a maximum of 12%.

Preferred layer sequences are (S1)/(S2) or (S2)/(S1)/(S2) or (S3/(S1)/(S4). The layers are here indicated from top to bottom, i.e. (S1)/(S2) means, for example, that (S1) forms the topmost layer and (S2) the bottommost layer of the molded body.

In accordance with a further preferred embodiment of the present invention, the molded body has the layers (S2), (53), or (S4) that are based on the polyamide mixture (A), or on polyamide (A1), or on polyamide (A2), or on a polyamide different from (A1) and (A2) and that preferably consist thereof. The term "based/basis" in the sense of the present application is to be interpreted such that the layer comprises at least 50%, preferably at least 70%, and particularly preferably at least 90%, of this layer.

Another preferred embodiment of the present invention provides that the mean layer thickness of the layer (S1) is at least 2 times as large, preferably at least 5 times as large, and particularly preferably at least 9 times as large, as the sum of all the mean layer thicknesses of the layers (S2), (S3), or (S4).

In accordance with another preferred embodiment of the present invention, the weight ratio of the layer (S1) in the molded body is at least 2 times larger, preferably at least 5 times larger, and particularly preferably at least 10 times, larger, than the weight ratio of all the layers (S2, (S3), and (S4) in the molded body.

In accordance with a further preferred embodiment of the present invention, the layers (S2), (S3), or (S4) are on the basis of a polyamide selected from the group comprising PA MACM12, PA MACMI/MACMT/12, PA 6I/6T/612/MACMI/MACMT/MACM12, PA MACM12/PACM12, PA 11, PA 12, and mixtures thereof or preferably consist thereof.

In accordance with another embodiment of the present invention, the layer (S2), (S3), or (S4) is back injection molded with the layer (51) or the layers (S1) and (S2), (53), or (S4) were produced by two-component or multi-component injection molding (mono-sandwich process), with the multilayer molded body being integrally produced in one injection molding cycle.

Use of Transparent Polyamide

The present invention further relates to the use of at least one transparent polyamide (A1) that is amorphous or microcrystalline and that has at least 25 mol % of monomers having aromatic structural units, with respect to the total quantity of diamines and dicarboxylic acids, for reducing the haze of a polyamide molding compound that also has, in addition to at least one transparent polyamide (A2) that is amorphous or microcrystalline and has less than 25 mol % of monomers having aromatic structural units, with respect to the total quantity of diamines and dicarboxylic acids, a glass filler having a refractive index in the range from 1.510 to 1.539 and optionally has additives. The polyamides (A1) and (A2) form the polyamide mixture (A) here.

In accordance with a preferred embodiment, the proportion of the polyamide (A1) in the polyamide mixture (A) is larger than 50 wt % if the ratio Δ2/Δ1>1 and the proportion of the polyamide (A2) in the polyamide mixture (A) comprising (A1) and (A2) is larger than 50 wt % if the ratio Δ2/Δ1≤1.

The subject matter in accordance with the invention will be explained in more detail with reference to the following examples without intending to restrict it to the specific embodiments shown here.

1 MEASUREMENT METHODS

The following measurement methods were used within the framework of this application:

Surface Roughness, $R_a$, $R_z$

The roughness of the test specimens was measured in accordance with DIN EN ISO 4287 (2010-07) using a MarSurf XR1 Surface Measuring Station of Mahr GmbH (DE). The roughness values, that is, the arithmetical mean roughness Ra and the surface roughness $R_z$, are given in micrometers (μm).

Haze, Transparency

The transparency and haze were measured in accordance with ASTM D1003 on a measuring device Haze Gard Plus of BYK Garder at plates of 2 mm thickness (60 mm×60 mm surface) with CIE light type C at 23° C. The surface of the specimen (plate 60×60×2 mm) had an arithmetical mean roughness $R_a$ and a surface roughness $R_z$ as explicitly specified for the molding compounds in accordance with the examples and comparison examples in Table 2 or for the multilayer molded body. The manufacture of the test specimens will be described under item 3.3.

Melting point ($T_m$) and melt enthalpy ($\Delta H_m$)

The melting point and the enthalpy of fusion were determined in accordance with ISO 11357-3 (2013) on pellets. The DSC (differential scanning calorimetry) measurements were performed at a heating rate of 20 K/min.

Glass Transition Temperature, $T_g$

The determination of the glass transition temperature $T_g$ took place in accordance with ISO 11357-2 (2013) at pellets by means of differential scanning calorimetry (DSC). It was performed in each of the two heating steps at a heating rate of 20 K/min. The sample was quenched in dry ice after the first heating. The glass transition temperature ($T_g$) was determined in the second heating step. The center of the glass transition zone, that was here specified as the glass transition temperature, was determined using the "half height" method.

Relative viscosity, $\eta_{rel}$ The relative viscosity was determined in accordance with IS 307 (2007) at 20° C. 0.5 g polymer pellets were weighed into 100 ml m-cresol for this purpose; the calculation of the relative viscosity (RV) after RV=t/t$_0$ took place on the basis of the section 11 of the standard.

Modulus of Elasticity

The determination of the modulus of elasticity was carried out in accordance with ISO 527 (2012) at 23° C. at a tensile speed of 1 mm/min at an ISO tensile rod (type A1, mass 170×20/10×4) manufactured in accordance with the standard: ISO/CD 3167 (2003).

Failure Stress and Elongation at Break

The determination of the failure stress and of the elongation at break was carried out in accordance with ISO 527 (2012) at 23° C. at a tensile speed of 5 mm/min at an ISO tensile rod (type A1, mass 170×20/10×4) manufactured in accordance with the standard ISO/CD 3167 (2003).

Impact Resistance According to Charpy

The determination of the impact resistance was carried out according to Charpy in accordance with ISO 179/2*eU (1997, *2=instrumented) at 23° C. at an ISO test rod, Type B1 (mass 80×10×4 mm), manufactured in accordance with the standard ISO/CD 3167 (2003).

Notch Impact Resistance According to Charpy

The determination of the notch impact resistance according to Charpy was carried out in accordance with ISO 179/2*eA (1997, *2=instrumented) at 23° C. at an ISO test rod, Type B1 (mass 80×10×4 mm), manufactured in accordance with the standard ISO/CD 3167 (2003).

Heat Deflection Temperature (HDT)

The heat deflection temperature (HDT) or also deformation temperature under load is reported as HDT/A and/or HDT/B. HDT/A corresponds to method A having a bending stress of 1.80 MPa and HDT/B corresponds to method C having a bending stress of 0.45 MPa. HDT was determined in accordance with ISO 75 (2013-04) at ISO baffle rods with the dimensions 80×10×4 mm.

Measuring the Refractive Index of Glass Fibers

The determination of the refractive index of glass fibers took place using the Beck's line method and using immersion fluids with respect to 589 nm based on method B of ISO 489 (1999-04).

Measuring the Refractive Index of Polyamides

The refractive index of the polyamides A1 and A2 was determined in accordance with ISO 489 (1999-04) at plates of 2 mm thickness (60×60×2 mm) at a wavelength of 589 nm and at a temperature of 23° C. by means of an Abbe refractometer of Carl Zeiss (method A). 1-2-bromonaphthalene was applied as the contact fluid between the examined plate and the prism surface.

2. STARTING MATERIALS

The materials used in the examples and in the comparison examples are collated in Table 1.

TABLE 1

Materials used in the examples and in the comparison examples

| Components | Description | Manufacturer |
| --- | --- | --- |
| Polyamide 1 (Component (A1)) | PA MACMI/MACMT/12 (38/38/24), amorphous<br>Rel. viscosity = 1.56<br>Aromatic structural units: 50 mol %<br>Refractive index: 1.542<br>Transparency: 93%; Haze: 0.5%; Tg: 190° C. | EMS-CHEMIE AG (Switzerland) |
| Polyamide 2 (Component (A2)) | PA MACM12 (amorphous)<br>Rel. viscosity = 1.71<br>Aromatic structural units: 0 mol %<br>Refractive index: 1.509<br>Transparency: 93%; Haze: 0.3%; Tg: 155° C. | EMS-CHEMIE AG (Switzerland) |
| Polyamide 3 (Component (A2)) | PA MACM12/PACM12 (microcrystalline)<br>Rel. viscosity = 1.82<br>Aromatic structural units: 0 mol %<br>Refractive index: 1.5133<br>Transparency: 93%; Haze: 0.4%; Tg: 145° C.<br>Melting heat: 14 J/g | EMS-CHEMIE AG (Switzerland) |
| Polyamide 4 (Component (A2)) | PA PACM12 (amorphous)<br>Rel. viscosity = 1.86<br>Aromatic structural units: 0 mol %<br>Refractive index: 1.5180<br>Transparency: 93%; Haze: 0.7%; Tg: 141° C. | EMS-CHEMIE AG (Switzerland) |
| Glass fiber 1 | OC HPXSS HTX10<br>Refractive index = 1.516 | Owens Corning (BE, US) |
| Glass fiber 2 | AGY SG37 553 5-32<br>Refractive index = 1.524 | AGY (FR) |
| LC12 | Laurolactam, CAS: 947-04-6 | EMS-CHEMIE AG (Switzerland) |
| HD-PB | Exceparl hd-pb, 2-Hexyl-decyl-p-hydroxybenzoate, CAS: 148348-12-3 | KAO Chemicals Europe |

3 EXAMPLES AND COMPARISON EXAMPLES 3.1 Manufacturing the Polyamide Molding Compounds The compounds are generally mixed (compounded) on standard compounding machines such as single-shaft or twin-shaft extruders or screw kneaders in the polymer melt to manufacture the plastic molding compound. The components are here individually metered into the feeder or are supplied in the form of a dry blend. If additives are used, they can be introduced directly or in the form of a master batch. In a dry blend manufacture, the dried polymer pellets and the additives are mixed. The mixing can take place under a dried protective gas to avoid moisture absorption. The glass fibers used are metered into the polymer melt in the intended ratio via a side feeder and are further homogenized in the cylinder of the compounding machine. The metering of all the components into the feeder or side feeder are set via electronically controlled scales such that the desired quantity ratios of glass-polymer result therefrom.

The compounding takes place at set extruder cylinder temperatures of e.g. 230° C. to 350° C. Vacuum can be applied or atmospheric degassing can take place in front of the nozzle. The melt is output into a water bath in extruded form and is pelletized. An underwater pelletization or a strand pelletization is preferably used for pelletization. The plastic molding compound thus preferably obtained in pellet form is subsequently dried and can then be further processed to molded bodies by injection molding. This takes place via a repeat melting of the dry pellets in a heatable cylinder and conveying s the melt into an injection mold in which the melt can solidify.

3.2 Manufacture of the Polyamide Molding Compound in Accordance with Examples B1 to B8

The molding compounds for the examples B1 to B8 and for the comparison examples VB1 to VB3 were manufactured on a twin shaft extruder of the company Werner and Pfleiderer, Type ZSK25. The polyamides (A1) and (A2) were metered into the feed of the extruder via metering trolleys in the quantity portions specified in Table 2. Fine powder LC-12 is applied to the polyamides (A1) and (A2) by tumbling and is metered with them into the feed. HD-PB is metered into zone 7 via a nozzle. The glass fibers used were conveyed into the polymer melt in the intended ratio via a side feeder (zone 6) and were further homogenized in the cylinder of the compounding machine.

The temperature of the first housing was set to 80° C.; that of the remaining housings in an increasing manner from 270 to 300° C. A speed of 200 r.p.m. and a throughput of 15 kg/h was used and degassing took place in the third zone in front of the nozzle in the nitrogen stream. The polyamide molding compound output as a strand was cooled in a water bath at 80° C. and pelletized, and the obtained pellets were dried at 90° C. in vacuum at 30 mbar to a water content of below 0.1 wt %.

3.3 Manufacture of the Test Specimens

Tensile rods, baffle rods, and plates were injected from the pellets obtained as test specimens at which the properties specified in Table 2 were determined. The test specimens were manufactured on an injection molding machine of Arburg, model Allrounder 420 C 1000-250. Increasing cylinder temperatures from 250° C. to 290° C. were used here. The melt temperature for all the injected molded bodies amounted to 290-300° C. in each case. The tool temperature was at 120° C. in each case in the case of plates (2 mm×60 mm×60 mm). The tool temperatures of the tensile rods and of the baffle rods were 80° C. in each case. The test specimens were used in the dry state if not otherwise specified; for this purpose, they were stored at room temperature for at least 48 h after the injection molding in a dry environment, i.e. over silica gel.

In the case of plates (2 mm×60 mm×60 mm) for determining the optical properties, the surfaces of the cavity of the injection mold were given a mirror finish so that the molded bodies (plates) had a high gloss surface having an arithmetical mean roughness Ra of 0.01 to 0.08 µm and/or a surface roughness Rz of 0.05 to 1.0 µm, in accordance with DIN EN ISO 4287.

3.4 Results 3.4.1 Single-Layer Molded Bodies

The following Table 2 relates to examples in accordance with the present invention, and comparison examples.

TABLE 2

| | | \multicolumn{6}{c}{Examples and comparison examples.} | | | | | |
| --- | --- | --- | --- | --- | --- | --- | --- |
| | Unit | B1 | B2 | B3 | B4 | B5 | B6 |
| Components | | | | | | | |
| Polyamide 1 | Wt % | 36 | 40.5 | 31.5 | 28 | 10 | 24 |
| Proportion of (A1) in (A) | Wt % | 45.0 | 45.0 | 45.0 | 35.0 | 12.5 | 30.0 |
| Polyamide 2 | Wt % | 44 | 49.5 | 38.5 | — | — | — |
| Polyamide 3 | Wt % | — | — | — | 52 | 70 | — |
| Polyamide 4 | Wt % | — | — | — | — | — | 56 |
| Proportion of (A2) in (A) | Wt % | 55.0 | 55.0 | 55.0 | 65.0 | 87.5 | 70.0 |
| Δ1 | — | 0.018 | 0.018 | 0.018 | 0.018 | 0.026 | 0.018 |
| Δ2 | — | 0.015 | 0.015 | 0.015 | 0.0107 | 0.0027 | 0.006 |
| Δ2/Δ1 | — | 0.83 | 0.83 | 0.83 | 0.59 | 0.10 | 0.33 |
| HD-PB | Wt % | — | — | — | — | — | — |
| LC12 | Wt % | — | — | — | — | — | — |
| Glass fiber 1 | Wt % | — | — | — | — | 20 | — |
| Glass fiber 2 | Wt % | 20 | 10 | 30 | 20 | — | 20 |
| Properties | | | | | | | |
| Tg molding compound | ° C. | 148 | 148 | 148 | 148 | 154 | 151 |
| Haze molding compound | % | 18 | 10 | 28 | 20 | 22 | 21 |
| Transparency Molding compound | % | 90 | 92 | 89 | 90 | 90 | 90 |
| Tg Mixture A | ° C. | 148 | 148 | 148 | 148 | 154 | 152 |
| Haze Mixture A | % | 0.5 | 0.5 | 0.5 | 0.7 | 0.7 | 0.8 |
| Transparency Mixture A | % | 93 | 93 | 93 | 93 | 93 | 92 |
| Ra plate 60 × 60 × 2 mm | µm | 0.059 | 0.050 | 0.063 | 0.061 | 0.059 | 0.062 |
| Rz plate 60 × 60 × 2 mm | µm | 0.784 | 0.688 | 0.833 | 0.797 | 0.761 | 0.812 |
| Modulus of elasticity | MPa | 6130 | 3480 | 8180 | 5900 | 6100 | 5800 |
| Tensile strength | MPa | 148 | 89 | 170 | 135 | 132 | 133 |
| Elongation at break | % | 4.1 | 7.7 | 3.4 | 4.8 | 5.6 | 4.4 |
| Impact resistance | kJ/mm$^2$ | 48 | 34 | 54 | 92 | 94 | 70 |
| Notch impact resistance | kJ/mm$^2$ | 12 | 10 | 12 | 12 | 13 | 11 |
| HDT A | ° C. | 157 | 154 | 158 | 151 | 152 | 143 |
| HDT B | ° C. | 164 | 163 | 165 | 156 | 156 | 146 |

TABLE 2-continued

Examples and comparison examples.

|  | B7 | B8 | VB1 | VB2 | VB3 | VB4 |
|---|---|---|---|---|---|---|
| Components | | | | | | |
| Polyamide 1 | 33.75 | 22.9 | 56 | 50 | 80 | — |
| Proportion of (A1) in (A) | 45.0 | 28.6 | 70 | 62.5 | 100 | — |
| Polyamide 2 | 41.25 | 57.1 | 24 | 30 | — | 80 |
| Polyamide 3 | — | — | — | — | — | — |
| Polyamide 4 | — | — | — | — | — | — |
| Proportion of (A2) in (A) | 55.0 | 71.4 | 30.0 | 37.5 | — | 100 |
| A1 | 0.018 | 0.026 | 0.026 | 0.018 | — | — |
| A2 | 0.015 | 0.007 | 0.007 | 0.015 | — | — |
| A2/A1 | 0.83 | 0.27 | 0.27 | 0.83 | — | — |
| HD-PB | 5 | — | — | — | — | — |
| LC12 | — | 5 | — | — | — | — |
| Glass fiber 1 | — | 15 | 20 | — | — | 20 |
| Glass fiber 2 | 20 | — | — | 20 | 20 | — |
| Properties | | | | | | |
| Tg molding compound | 148 | 154 | 160 | 158 | 190 | 155 |
| Haze molding compound | 19 | 16 | 43 | 48 | 79 | 86 |
| Transparency Molding compound | 90 | 90 | 87 | 88 | 84 | 86 |
| Tg Mixture A | 148 | 154 | 161 | 158 | — | — |
| Haze Mixture A | 0.7 | 0.5 | 1.7 | 0.5 | — | — |
| Transparency Mixture A | 92 | 93 | 93 | 93 | — | — |
| Ra plate 60 × 60 × 2 mm | 0.055 | 0.058 | 0.059 | 0.057 | 0.055 | 0.058 |
| Rz plate 60 × 60 × 2 mm | 0.746 | 0.722 | 0.779 | 0.764 | 0.750 | 0.717 |
| Modulus of elasticity | 6020 | 5260 | 5790 | 6250 | 5880 | 5750 |
| Tensile strength | 149 | 132 | 128 | 131 | 133 | 129 |
| Elongation at break | 3.3 | 3.3 | 4.4 | 4.4 | 4.0 | 6.1 |
| Impact resistance | 33 | 35 | 47 | 46 | 45 | 88 |
| Notch impact resistance | 10 | 10 | 11 | 11 | 10 | 12 |
| HDT A | — | — | 161 | 158 | 175 | 135 |
| HDT B | — | — | 168 | 165 | 180 | 141 |

3.4.2 3-Layer Molded Bodies of the Dimension 60×60×2 mm

Manufacture of the Multilayer Molded Bodies

The following multilayer molded bodies of the dimension 60×60×2 mm were manufactured by back injection molding of films of non-reinforced, transparent polyamide using the polyamide molding compound in accordance with the invention. The manufacture took place on an injection molding machine of Arburg 420C 1000-250 using the conditions described above for the 60×60×2 mm plates. Two extruded films produced from the polyamide 1 (PA MACMI/MACMT/12 (component (A1)), each having a thickness of 100 mm were cut to the size 60×60×0.1 mm, were placed into the injection molding tool, and the remaining cavity between the two films after the closing of the tool was filled by injection the polyamide molding compound in accordance with the invention from example 1 or 3. After cooling, the multilayer molded body was demolded and the transparency and haze were determined in accordance with ASTM D1003. The insertion films of polyamide 1 were no longer able to be removed from the multilayer molded body after the injection molding process, but were rather connected with material continuity to the molding compound from the examples B1, B4, and B7.

| Multilayer molded body 1 | | |
|---|---|---|
| Structure of the multilayer molded body of the dimension 60 × 60 × 2 mm | External Central Internal | Film of polyamide 1 (t) Molding compound of example 1 Film of polyamide 1 (b) |
| Transparency | % | 91 |
| Haze | % | 7.0 |
| Ra (t/b) (plate 60 × 60 × 2 mm) | μm | 0.021/0.022 |
| Rz (t/b) (plate 60 × 60 × 2 mm) | μm | 0.248/0.252 |
| Multilayer molded body 2 | | |
| Structure of the multilayer molded body of the dimension 60 × 60 × 2 mm | External Central Internal | Film of polyamide 1 (t) Molding compound of example 4 Film of polyamide 1 (b) |
| Transparency | % | 91 |
| Haze | % | 6.5 |
| Ra (t/b) (plate 60 × 60 × 2 mm) | μm | 0.022/0.025 |
| Rz (t/b) (plate 60 × 60 × 2 mm) | μm | 0.255/0.314 |
| Multilayer molded body 3 | | |
| Structure of the multilayer molded body of the dimension 60 × 60 × 2 mm | External Central Internal | Film of polyamide 1 (t) Molding compound of example 7 Film of polyamide 1 (b) |
| Transparency | % | 91 |
| Haze | % | 6.3 |
| Ra (t/b) (plate 60 × 60 × 2 mm) | μm | 0.023/0.026 |
| Rz (t/b) (plate 60 × 60 × 2 mm) | μm | 0.244/0.326 |

4 DISCUSSION OF THE RESULTS

It can be seen from Table 2 that the polyamide molding compounds in accordance examples B1 to B8 in accordance with the invention have very good optical properties. The haze of the filled polyamide molding compounds is in the range from 16 to 28% and the transparency is in the range from 89 to 92%. The polyamide molding compounds in accordance with the comparison examples VB1 to VB4 in contrast demonstrate much higher haze values in the range from 43 to 86%. The polyamide molding compounds in accordance with the comparison examples VB3 and VB4 each comprise only one polyamide (A1) or (A2), whereas the polyamide molding compounds in accordance with the comparison examples VB1 and VB2 just like the polyamide molding compounds in accordance with the invention comprise a mixture of the polyamides (A1) and (A2). The polyamide molding compounds in accordance with the comparison examples VB1 and VB2, however, satisfy the condition that the content of (A2) in the mixture (A) is >50 wt % if the ratio is not Δ2/Δ1≤1, but the proportion of (A1) in mixture (A) is greater than 50 wt % in these polyamide molding compounds. Providing polyamide molding compounds filled with a glass filler that have very good optical properties is therefore surprisingly only successful by the specific feature combination in accordance with the invention. Since the surface roughness in all examples is at the same high level, the differences in transparency and in haze clearly originate from the selected composition of the molding compound.

It has further been shown that multilayer molded bodies that have very good optical properties, in particular a low haze and good transparency can also be manufactured from the polyamide molding compounds in accordance with the invention. These molded bodies furthermore have a very good surface, the mean roughness value Ra and the surface roughness $R_z$ are in particular at a low level and this is despite the use of high viscosity starting materials (A1) and (A2). Due to the high viscosity of the starting substances, on the other hand, the high strength and toughness of the molded bodies is ensured; the impact resistance and the elongation at break are in particular considerably improved with respect to low viscosity types.

The invention claimed is:

1. A polyamide molding compound comprising the following components:
  (A) 50 to 95 wt % of a mixture consisting of the polyamides (A1) and (A2), wherein
    (A1) is at least one transparent, semi-aromatic polyamide having at least 25 mol % of monomers having aromatic structural units, related to the total quantity of diamines and dicarboxylic acids in the polyamide (A1) that is amorphous or microcrystalline; and
    (A2) is at least one transparent polyamide having less than 25 mol % of monomers having aromatic structural units, related to the total quantity of diamines and dicarboxylic acids in the polyamide (A2) that is amorphous or microcrystalline;
  (B) 5 to 50 wt % of at least one glass filler having a refractive index in the range from 1.510 to 1.539; and
  (C) 0 to 10 wt % of at least one additive;
  wherein the weight proportions of the components (A) to (C) add up to 100% by weight;
  wherein the content of (A1) in the mixture (A) is >50 wt %, if the ratio is Δ2/Δ1>1 and the content of (A2) in the mixture (A) is >50 wt %, if the ratio is Δ2/Δ1≤1, where Δ1=n (A1)−n(B) applies and Δ2=n(B)−n(A2) applies; n being the refractive index measured according to ISO 489 (1999-04),
  wherein the transparent polyamides (A1) and (A2) have a transparency of at least 90% and a haze of at most 3%; and
  wherein the mixture (A) has a transparency of at least 88% and a haze of at most 5%.

2. The polyamide molding compound in accordance with claim 1, wherein the polyamide mixture (A) comprises 51 to 95 wt % of polyamide (A1) and 5 to 49 wt % of polyamide (A2) if Δ2/Δ1>1; or
  the polyamide mixture (A) comprises 51 to 95 wt % of polyamide (A2) and 5 to 49 wt % of polyamide (A1) if Δ2/Δ1≤1;
  and/or
  the proportion of component (A) in the polyamide molding compound is in the range from 55 to 90 wt % with respect to the sum of components (A) to (C);
  and/or
  the proportion of component (B) in the polyamide molding compound is in the range from 10 to 40 wt % with respect to the sum of components (A) to (C);
  and/or
  the proportion of component (C) in the molding compound is in the range from 0 to 7 wt % with respect to the sum of components (A) to (C).

3. The polyamide molding compound in accordance with claim 1, wherein the transparent polyamides (A1) are made up of the following monomers:
  (a-A1) 20 to 100 mol % of cycloaliphatic diamines, with respect to the total quantity of diamines;
  (b-A1) 0 to 80 mol % of diamines having aromatic structural units, with respect to the total quantity of diamines;
  (c-A1) 0 to 80 mol % of open-chain cycloaliphatic diamines, with respect to the total quantity of diamines;
  (d-A1) 0 to 75 mol % of open-chain aliphatic dicarboxylic acids, with respect to the total quantity of dicarboxylic acids;
  (e-A1) 25 to 100 mol % of aromatic dicarboxylic acids, with respect to the total quantity of dicarboxylic acids;
  (f-A1) 0 to 75 mol % of cycloaliphatic dicarboxylic acids, with respect to the total quantity of dicarboxylic acids; and
  (g-A1) 0 to 40 wt % of lactams and/or aminocarboxylic acids having 6 to 12 carbon atoms, with respect to the total quantity of the monomers (a-A1) to (g-A1),
  wherein the sum of the diamines (a-A1), (b-A1), and (c-A1) produces 100 mol %;
  wherein the sum of the dicarboxylic acids (d-A1), (e-A1), and (f-A1) produces 100 mol %; and
  wherein the sum of the monomers (b-A1) and (e-A1) amounts to at least 25 mol %, with respect to the sum of the total diamines and of the total dicarboxylic acids in the polyamide (A1).

4. The polyamide molding compound in accordance with claim 1, wherein the transparent polyamide (A1) comprises at least 27 mol %, and in the range from 25 to 100 mol % of monomers having aromatic structural units, with respect to the total quantity of diamines and dicarboxylic acids in the polyamide (A1).

5. The polyamide molding compound in accordance with claim 1, wherein the transparent polyamides (A2) are made up of the following monomers:
  (a-A2) 20 to 100 mol % of cycloaliphatic diamines, with respect to the total quantity of diamines;

(b-A2) 0 to less than 50 mol % of diamines having aromatic structural units, with respect to the total quantity of diamines;

(c-A2) 0 to 80 mol % of open-chain aliphatic diamines, with respect to the total quantity of diamines;

(d-A2) 20 to 100 mol % of open-chain aliphatic dicarboxylic acids, with respect to the total quantity of dicarboxylic acids;

(e-A2) 0 to less than 50 mol % of aromatic dicarboxylic acids, with respect to the total quantity of dicarboxylic acids;

(f-A2) 0 to 80 mol % of cycloaliphatic dicarboxylic acids, with respect to the total quantity of dicarboxylic acids; and (g-A2) 0 to 40 wt % of lactams and/or aminocarboxylic acids having 6 to 12 carbon atoms, with respect to the total quantity of the monomers (a-A2) to (g-A2);

wherein the sum of the diamines (a-A2), (b-A2), and (c-A2) produces 100 mol %;

wherein the sum of the dicarboxylic acids (d-A2), (e-A2), and (f-A2) produces 100 mol %; and wherein the sum of the monomers (b-A2) and (e-A2) amounts to less than 25 mol %, with respect to the sum of the total diamines and of the total dicarboxylic acids in the polyamide (A2).

6. The polyamide molding compound in accordance with claim 1, wherein the transparent polyamide (A2) comprises at most 23 mol % of monomers having aromatic structural units, with respect to the total quantity of diamines and dicarboxylic acids in the polyamide (A2).

7. The polyamide molding compound in accordance with claim 1, wherein the transparency measured in accordance with ASTM D1003 at a molded body (plate with the dimensions 60×60×2 mm) manufactured from the polyamide molding compound amounts to at least 80%; and/or the haze measured in accordance with ASTM D1003 at a molded body (plate with the dimension 60×60×2 mm) manufactured from the polyamide molding compound amounts to a maximum of 40%; and/or the arithmetical mean roughness Ra determined in accordance with DIN EN ISO 4287 (2010-07) at a molded body (plate with the dimension 60×60×2 mm) produced from the polyamide molding compound using a MarSurf XR1 Surface Measuring Station amounts to at most 0.12 μm, and/or has a surface roughness $R_z$ of at most 1.50 μm.

8. The polyamide molding compound in accordance with claim 3, wherein the cycloaliphatic diamine (a-A1) is selected from the group consisting of bis(4-amino-3-methylcyclohexyl) methane, bis-(4-aminocylcohexyl)methane, bis-(4-amino-3-ethylcyclohexyl)methane, bis-(4-amino-3,5,-dimethylcyclohexyl)methane, 2,6-norbornane diamine, 2,6-bis-(aminomethyl)-norbornane, 1,3-diaminocyclohexane, 1,4-diaminocyclohexanediamine, isophorone diamine, 1,3-bis-(aminomethyl)cyclohexane, 1,4-bis-(aminomethyl)cyclohexane, 2,2-(4,4'-diamonodicyclohexyl)propane, and mixtures thereof;

and/or the diamine having aromatic structural unit (b-A1) is a xylylenediamine;

and/or the open-chain aliphatic diamine (c-A1) is a hexanediamine, and/or the aliphatic dicarboxylic acid (d-A1) is selected from the group consisting of 1,6-apidic acid, 1,9-nonanedioic acid, 1,10-decanedioic acid, 1,11-undecanedioic acid, 1,12 dedecanedioic acid, 1,13-tridecanedioic acid, 1,14-tetradecanedioic acid, 1,16-hexadecanedioic acid, 1,18-octadecanedioic acid, and mixtures thereof;

and/or the aromatic dicarboxylic acid (e-A1) is selected from the group consisting of terephthalic acid, isophthalic acid, a naphthalenedicarboxylic acid (NDA), biphenyldicarboxylic acid, 1,5-anthracene dicarboxylic acid, p-terphenylene-4,4"-dicarboxylic acid, 2,5-pyridine dicarboxylic acid, and mixtures thereof;

and/or the cycloaliphatic dicarboxylic acid (f-A1) is selected from the group consisting of 1,3-cyclopentanedicarboxylic acid, 1,3-cyclohexanedicarboxylic acid, 1,4-cyclohexanedicarboxylic acid, 2,3-norbornanedicarboxylic acid, 2,6-norbornanedicarboxylic acid, and mixtures thereof;

and/or the lactam and/or the aminocarboxylic acid (g-A1) are selected from the group consisting of m-aminobenzoic acid, p-aminobenzoic acid, caprolactam (CL), α,ω-aminocaproic acid, α,ω-aminoheptanoic acid, α,ω-aminooctanoic acid, α,ω-aminononanoic acid, α,ω-aminodecanoic acid, α,ω-aminoundecanoic acid (AUA), laurolactam (LL), and α,ω-aminododecanoic acid (ADA).

9. The polyamide molding compound in accordance with claim 1, wherein the monomers having aromatic structural units for the transparent polyamides (A1) and (A2) are selected from the group consisting of terephthalic acid, isophthalic acid, naphthalenedicarboxylic acid (NDA), biphenyldicarboxylic acid, 4,4'-diphenyl ether dicarboxylic acid, 4,4'-diphenylmethanedicarboxylic acid, 4,4'-diphenylsulfonedicarboxylic acid, 1,5-anthracene dicarboxylic acid, p-terphenylene-4,4"-dicarboxylic acid, 2,5-pyridinedicarboxylic acid, and xylylenediamine; and the monomers having aromatic structural units for the transparent polyamides (A1) and (A2) are selected from the group consisting of terephthalic acid, isophthalic acid, 1,5-naphthalenedicarboxylic acid, 2,6-naphthalenedicarboxylic acid, meta-xylylenediamine and mixtures thereof.

10. The polyamide molding compound in accordance with claim 1, wherein the polyamide (A1) is selected from the group consisting of PA MACMI/12, PA MACMT/12, PA MACMI/MACMT/12, PA MACMI/MACMT/MACM12, PA 6I/6T/MACMI/MACMT, PA 6I/6T/MACMI/MACMT/12, PA 6I/MACMI/, PA 6I/6T/PACMI/PACMT, PA 6I/612MACMI/MACM12, PA 6I/6T/MACMI/MACMT/PACMI/PACMT, PA 6I/6T/MACMI/MACMT/PACMI/PACMT/12, PA MACMI/MACMT/MACM36, PA MACMI/MACM36, PA MACMT/MACM36, PA 12/PACMI, PA 12/MACMT, PA 6/PACMT, PA 6/PACMI, PA MXDI, PA MXDI/MXD6, PA MXDI/MXD10, PA MXDI/MXDT, PA MXDI/MACMI, PA MXDI/MXDT/MACMI/MACMT, PA 6I/6T/BACI/BACT, PA MACMI/MACMT/BACI/BACT, PA 6I/6T/MACMI/MACMT/BACI/BACT, and mixtures thereof;

and/or the polyamide (A2) is selected from the group consisting of PA MACM9, PA MACM10, PA MACM11, PA MACM12, PA MACM13, PA MACM14, PA MACM15, PA MACM16, PA MACM17, PA MACM18, PA MACM36, PA PACM9, PA PACM10, PA PACM11, PA PACM12, PA PACM13, PA PACM14, PA PACM15, PA PACM16, PA PACM17, PA PACM18, PA PACM36, PA TMDC9, PA TMDC10, PA TMDC11, PA TMDC12, PA TMDC13, PA TMDC14, PA TMDC15, PA TMDC16, PA TMDC17, PA TMDC18, PA TMDC36, PA MACM10/1010, PA MACM10/PACM10, PA MACM12/1012, PA MACM14/1014, PA PACM10/1010, PA PACM12/1012, PA PACM14/1014, PA MACM12/PACM12, PA MACM14/PACM14, MACMI/MACM12, PA MACMT/MACM12, PA MACMI/MACMT/MACM12, PA MACMI/MACMT/10I/10T/1012, PA 6I/6T/612/MACMI/MACMT/MACM12, PA 6I/6T/612/PACMI/PACMT/PACM12, PA 6I/612/MACMI/MACM12, PA 6T/612/MACMT/MACM12, PA 10T/1012/MACMT/MACM12, PA 10I/1012/MACMI/MACM12, PA 6I/6T/MACMI/MACMT/PACMI/PACMT/MACM12/PACM12, PA MACMI/PACMI/MACM12/PACM12, PA MACMT/PACMT/MACM12/PACM12, PA MACMI/PACMT/MACM12/PACM12, PA MACMI/MACM36, PA MACMI/MACMT/MaCM36, PA 1012/MACMI, PA 1012/MACMT, 1010/MACMI, PA 1010/MACMT, PA 612/MACMT, PA 610/MACMT, PA 612/MACMI, PA 610/MACMI, PA 1012/PACMI, PA 1012/PACMT, PA 1010/PACMI, PA 1010/PACMT, PA 612/PACMT, PA 612/PACMI, PA 610/PACMT, PA 610/PACMI, and mixtures thereof;
and/or
the polyamide mixture (A) comprises or consists of the following combinations of the polyamides (A1) and (A2):
polyamide (A1) PA MACMI/MACMT/12 and polyamide (A2) PA MACM12; or
polyamide (A1) PA MACMI/MACMT/12 and polyamide (A2) PA MACM10; or
polyamide (A1) PA MACMI/MACMT/12 and polyamide (A2) PA MACM14; or
polyamide (A1) PA MACMI/MACMT/12 and polyamide (A2) PA PACM10; or
polyamide (A1) PA MACMI/MACMT/12 and polyamide (A2) PA PACM14; or
polyamide (A1) PA MACMI/MACMT/12 and polyamide (A2) PA MACM12; or
polyamide (A1) PA MACMI//12 and polyamide (A2) PA MACM12; or
polyamide (A1) PA 6I/6T/MACMI/MACMT/MACM12 and polyamide (A2) PA MACM12.

11. The polyamide molding compound in accordance with claim 1, wherein the polyamide molding compound comprises the following components:
(A) 50 to 95 wt % of a mixture of
(A1) 25 to 48% polyamide PA MACMI/MACMT/12;
(A2) 52 to 75% polyamide PA MACM12;
(B) 5 to 50 wt % of at least one glass filler having a refractive index in the range from 1.510 to 1.539; and
(C) 0 to 10 wt % of at least one additive.

12. The polyamide molding compound in accordance with claim 1, wherein the at least one glass filler (B) is selected from the group consisting of glass fibers, ground glass fibers, glass particles, glass flakes, glass spheres, hollow glass spheres, and mixtures thereof.

13. The polyamide molding compound in accordance with claim 1, wherein the glass type of the at least one glass filler (B) is selected from the group consisting of S-glass, C-glass, and A-glass.

14. The polyamide molding compound in accordance with claim 1, wherein the at least one additive (C) is selected from the group consisting of inorganic and organic stabilizers, monomers, plasticizers, less than 5 wt % with respect to the total mass of the polyamide molding compound or to the sum of the components (A) to (C), semi-crystalline polyamides, impact modifiers, lubricants, colorants, marking means, photochromic agents, antistatic agents, demolding means, condensation catalysts, chain regulators, anti-foaming agents, anti-blocking agents, optical brighteners, halogen flame retardants, non-halogen flame retardants, natural sheet silicates, synthetic sheet silicates, nanoscale fillers having a particle size (d90) of a maximum of 100 nm, and mixtures thereof.

15. The polyamide molding compound in accordance with claim 1, wherein
component (A1) has a glass transition temperature determined in accordance with ISO 11357-2 of at least 135° C.; and/or
mixture (A) has a glass transition temperature determined in accordance with ISO 11357-2 of at least 135° C.; and/or
component (A1) has a glass transition temperature determined in accordance with ISO 11357-2 of at least 130° C.; and/or
the polyamide molding compound has a glass transition temperature determined in accordance with ISO 11357-2 of at least 130° C.

16. A molded body comprising a polyamide molding compound in accordance with claim 1.

17. The molded body in accordance with claim 16, wherein the molded body is a multilayer molded body.

18. The polyamide molding compound in accordance with claim 5, wherein
the cycloaliphatic diamine (a-A2) is selected from the group consisting of bis(4-amino-3-methylcyclohexyl)methane, bis-(4-aminocylcohexyl)methane, bis-(4-amino-3-ethylcyclohexyl)methane, bis-(4-amino-3,5,-dimethylcyclohexyl)methane, 2,6-norbornane diamine or 2,6-bis-(aminomethyl)-norborane, 1,3-diaminocyclohexane, 1,4-diaminocyclohexanediamine, isophorone diamine, 1,3-bis-(aminomethyl)cyclohexane, 1,4-bis-(aminomethyl)cyclohexane, 2,2-(4,4'-diamonodicyclohexyl)propane, and mixtures thereof;
and/or
the diamine having aromatic structural unit (b-A2) is a xylylenediamine;
and/or
the open-chain aliphatic diamine (c-A2) is a hexanediamine,
and/or
the aliphatic dicarboxylic acid (d-A2) is selected from the group consisting of 1,6-apidic acid, 1,9-nonanedioic acid, 1,10-decanedioic acid, 1,11-undecanedioic acid, 1,12 dedecanedioic acid, 1,13-tridecanedioic acid, 1,14-tetradecanedioic acid, 1,16-hexadecanedioic acid, 1,18-octadecanedioic acid, and mixtures thereof;
and/or
the aromatic dicarboxylic acid (e-A2) is selected from the group consisting of terephthalic acid, isophthalic acid, a naphthalenedicarboxylic acid (NDA), biphenyldicarboxylic acid, 1,5-anthracene dicarboxylic acid, p-terphenylene-4,4"-dicarboxylic acid, 2,5-pyridine dicarboxylic acid, and mixtures thereof;

and/or the cycloaliphatic dicarboxylic acid (f-A2) is selected from the group consisting of 1,3-cyclopentanedicarboxylic acid, 1,3-cyclohexanedicarboxylic acid, 1,4-cyclohexanedicarboxylic acid, 2,3-norbornanedicarboxylic acid, 2,6-norbornanedicarboxylic acid, and mixtures thereof;

and/or the lactam and/or the aminocarboxylic acid (g-A2) are selected from the group consisting of m-aminobenzoic acid, p-aminobenzoic acid, caprolactam (CL), aminocaproic acid, $\alpha,\omega$-aminoheptanoic acid, $\alpha,\omega$-aminooctanoic acid, $\alpha,\omega$-aminononanoic acid, $\alpha,\omega$-aminodecanoic acid, $\alpha,\omega$-aminoundecanoic acid (AUA), laurolactam (LL), and $\alpha,\omega$-aminododecanoic acid (ADA).

* * * * *